(12) United States Patent
Hunter et al.

(10) Patent No.: US 7,801,809 B1
(45) Date of Patent: Sep. 21, 2010

(54) SYSTEM AND METHOD FOR MANAGEMENT OF DELEGATED REAL ESTATE PROJECT REVIEWS

(75) Inventors: Jeanne M. Hunter, Chevy Chase, MD (US); Jocelyn Houle, Washington, DC (US); Sarmila Srivastav, Vienna, VA (US); Parvathi D. Rachakonda, Potomac Falls, VA (US); James L. Mountain, Arlington, VA (US)

(73) Assignee: Fannie Mae, Washington, DC (US)

( * ) Notice: Subject to any disclaimer, the term of this patent is extended or adjusted under 35 U.S.C. 154(b) by 949 days.

(21) Appl. No.: 11/167,068

(22) Filed: Jun. 24, 2005

(51) Int. Cl.
*G06Q 40/00* (2006.01)
(52) U.S. Cl. ...................................................... 705/38
(58) Field of Classification Search .................... 705/38
See application file for complete search history.

(56) References Cited

U.S. PATENT DOCUMENTS

| | | |
|---|---|---|
| 3,316,395 A | 4/1967 | Lavin |
| 4,876,648 A | 10/1989 | Lloyd |
| 5,239,462 A | 8/1993 | Jones et al. |
| 5,262,941 A | 11/1993 | Saladin et al. |
| 5,274,547 A | 12/1993 | Zoffel et al. |
| 5,323,315 A | 6/1994 | Highbloom |
| 5,361,201 A | 11/1994 | Jost et al. |
| 5,414,621 A | 5/1995 | Hough |
| 5,537,315 A | 7/1996 | Mitcham |
| 5,563,783 A | 10/1996 | Stolfo et al. |
| 5,611,052 A | 3/1997 | Dykstra et al. |
| 5,615,268 A | 3/1997 | Bisbee et al. |
| 5,689,649 A | 11/1997 | Altman et al. |
| 5,696,907 A | 12/1997 | Tom |
| 5,699,527 A | 12/1997 | Davidson |
| 5,732,400 A | 3/1998 | Mandler et al. |
| 5,765,144 A | 6/1998 | Larche et al. |
| 5,797,133 A | 8/1998 | Jones et al. |
| 5,870,721 A | 2/1999 | Norris |
| 5,878,403 A | 3/1999 | DeFrancesco et al. |
| 5,878,404 A | 3/1999 | Stout, Jr. et al. |
| 5,930,775 A | 7/1999 | McCauley et al. |

(Continued)

FOREIGN PATENT DOCUMENTS

JP 04182868 6/1992

(Continued)

OTHER PUBLICATIONS eLynx's SwiftSend Investor Delivery Connects Lenders to Secondary Market Dec. 13, 2006.*

(Continued)

*Primary Examiner*—Hani Kazimi
*Assistant Examiner*—William E Rankins
(74) *Attorney, Agent, or Firm*—Foley & Lardner LLP

(57) ABSTRACT

A data processing system comprises a database, lender user interface logic, and investor user interface logic. The database is configured to store information regarding a plurality of condo projects, including projects which are under development and projects which are completed. The lender user interface logic provides the lenders with access to the database to permit the lenders to add information in the database concerning the plurality of condo projects. The investor interface logic is configured to accept a real estate project with which one or more lenders are involved and configured to permit the investor to track the information added in the database by the lenders.

20 Claims, 28 Drawing Sheets

U.S. PATENT DOCUMENTS

| | | |
|---|---|---|
| 5,930,776 A | 7/1999 | Dykstra et al. |
| 5,940,811 A | 8/1999 | Norris |
| 5,940,812 A | 8/1999 | Tengel et al. |
| 5,966,699 A | 10/1999 | Zandi |
| 5,966,700 A | 10/1999 | Gould et al. |
| 5,970,464 A | 10/1999 | Apte et al. |
| 5,974,372 A | 10/1999 | Barnes et al. |
| 5,983,206 A | 11/1999 | Oppenheimer |
| 5,995,947 A * | 11/1999 | Fraser et al. ................. 705/38 |
| 6,014,645 A | 1/2000 | Cunningham |
| 6,021,202 A | 2/2000 | Anderson et al. |
| 6,029,149 A | 2/2000 | Dykstra et al. |
| 6,035,288 A | 3/2000 | Solomon |
| 6,044,362 A | 3/2000 | Neely |
| 6,070,151 A | 5/2000 | Frankel |
| 6,076,070 A | 6/2000 | Stack |
| 6,088,686 A | 7/2000 | Walker et al. |
| 6,105,007 A | 8/2000 | Norris |
| 6,112,190 A | 8/2000 | Fletcher et al. |
| 6,119,103 A | 9/2000 | Basch et al. |
| 6,125,349 A | 9/2000 | Maher |
| 6,144,948 A | 11/2000 | Walker et al. |
| 6,202,053 B1 | 3/2001 | Christiansen et al. |
| 6,226,624 B1 | 5/2001 | Watson et al. |
| 6,233,566 B1 | 5/2001 | Levine et al. |
| 6,289,319 B1 | 9/2001 | Lockwood |
| 6,311,169 B2 | 10/2001 | Duhon |
| 6,324,526 B1 | 11/2001 | D'Agostino |
| 6,367,013 B1 | 4/2002 | Bisbee et al. |
| 6,385,594 B1 | 5/2002 | Lebda et al. |
| 6,401,070 B1 | 6/2002 | McManus et al. |
| 6,405,181 B2 | 6/2002 | Lent et al. |
| 6,430,539 B1 | 8/2002 | Lazarus et al. |
| 6,438,526 B1 | 8/2002 | Dykes et al. |
| 6,505,176 B2 | 1/2003 | DeFrancesco, Jr. et al. |
| 6,513,018 B1 | 1/2003 | Culhane |
| 6,532,450 B1 | 3/2003 | Brown et al. |
| 6,584,467 B1 | 6/2003 | Haught et al. |
| 6,594,635 B1 | 7/2003 | Erlanger |
| 6,609,109 B1 | 8/2003 | Bradley et al. |
| 6,611,816 B2 | 8/2003 | Lebda et al. |
| 6,651,884 B2 | 11/2003 | Predergast et al. |
| 6,671,673 B1 | 12/2003 | Baseman et al. |
| 6,823,319 B1 | 11/2004 | Lynch et al. |
| 7,146,337 B1 | 12/2006 | Ward et al. |
| 7,254,559 B2 * | 8/2007 | Florance et al. ................. 705/51 |
| 7,321,864 B1 * | 1/2008 | Gendler ........................ 705/7 |
| 7,330,821 B2 * | 2/2008 | Wares ........................... 705/7 |
| 7,593,893 B1 * | 9/2009 | Ladd et al. .................... 705/38 |
| 2001/0029482 A1 | 10/2001 | Tealdi et al. |
| 2001/0032178 A1 | 10/2001 | Adams et al. |
| 2001/0037287 A1 | 11/2001 | Broadbent et al. |
| 2002/0029154 A1 | 3/2002 | Majoor |
| 2002/0029194 A1 | 3/2002 | Lewis et al. |
| 2002/0032635 A1 | 3/2002 | Harris et al. |
| 2002/0035520 A1 | 3/2002 | Weiss |
| 2002/0038318 A1 | 3/2002 | Cochran et al. |
| 2002/0040339 A1 | 4/2002 | Dhar et al. |
| 2002/0052815 A1 | 5/2002 | Johnson et al. |
| 2002/0052835 A1 | 5/2002 | Toscano |
| 2002/0059137 A1 | 5/2002 | Freeman et al. |
| 2002/0073020 A1 * | 6/2002 | McFarland et al. ............ 705/38 |
| 2002/0077968 A1 | 6/2002 | Kaniwa et al. |
| 2002/0087364 A1 | 7/2002 | Lerner et al. |
| 2002/0087389 A1 | 7/2002 | Sklarz et al. |
| 2002/0091550 A1 | 7/2002 | White et al. |
| 2002/0091629 A1 * | 7/2002 | Danpour ....................... 705/38 |
| 2002/0091630 A1 | 7/2002 | Inoue |
| 2002/0099650 A1 | 7/2002 | Cole |
| 2002/0111835 A1 | 8/2002 | Hele et al. |
| 2002/0111901 A1 | 8/2002 | Whitney |
| 2002/0138414 A1 | 9/2002 | Baker, IV |
| 2002/0152155 A1 | 10/2002 | Greenwood et al. |
| 2002/0152165 A1 | 10/2002 | Dutta et al. |
| 2002/0152170 A1 | 10/2002 | Dutta et al. |
| 2003/0023610 A1 | 1/2003 | Bove et al. |
| 2003/0028478 A1 | 2/2003 | Kinney et al. |
| 2003/0033241 A1 | 2/2003 | Harari |
| 2003/0033242 A1 | 2/2003 | Lynch et al. |
| 2003/0036994 A1 | 2/2003 | Witzig et al. |
| 2003/0036995 A1 | 2/2003 | Lazerson |
| 2003/0036996 A1 | 2/2003 | Lazerson |
| 2003/0046223 A1 | 3/2003 | Crawford et al. |
| 2003/0065614 A1 | 4/2003 | Sweeney |
| 2003/0078897 A1 * | 4/2003 | Florance et al. ............... 705/80 |
| 2003/0093366 A1 | 5/2003 | Halper et al. |
| 2003/0110249 A1 | 6/2003 | Buus et al. |
| 2003/0144949 A1 | 7/2003 | Blanch |
| 2003/0167191 A1 | 9/2003 | Slabonik et al. |
| 2003/0172025 A1 | 9/2003 | Gallina |
| 2003/0177032 A1 | 9/2003 | Bonissone et al. |
| 2003/0182159 A1 | 9/2003 | Bonissone et al. |
| 2003/0187696 A1 | 10/2003 | Bonissone et al. |
| 2003/0187697 A1 | 10/2003 | Bonissone et al. |
| 2003/0187698 A1 | 10/2003 | Bonissone et al. |
| 2003/0187699 A1 | 10/2003 | Bonissone et al. |
| 2003/0187700 A1 | 10/2003 | Bonissone et al. |
| 2003/0187701 A1 | 10/2003 | Bonissone et al. |
| 2003/0187702 A1 | 10/2003 | Bonissone et al. |
| 2003/0208385 A1 | 11/2003 | Zander et al. |
| 2003/0212654 A1 | 11/2003 | Harper et al. |
| 2003/0217034 A1 | 11/2003 | Shutt |
| 2003/0220879 A1 | 11/2003 | Gaughan et al. |
| 2003/0225662 A1 | 12/2003 | Horan et al. |
| 2003/0229553 A1 | 12/2003 | Kongyingyong et al. |
| 2003/0229581 A1 | 12/2003 | Green et al. |
| 2003/0233260 A1 | 12/2003 | Snell et al. |
| 2003/0233316 A1 | 12/2003 | Hu et al. |
| 2004/0002915 A1 | 1/2004 | McDonald et al. |
| 2004/0019517 A1 | 1/2004 | Sennott |
| 2004/0030616 A1 | 2/2004 | Florance et al. |
| 2004/0030649 A1 | 2/2004 | Nelson et al. |
| 2004/0034592 A1 | 2/2004 | Hu et al. |
| 2004/0049439 A1 | 3/2004 | Johnston et al. |
| 2004/0049445 A1 | 3/2004 | Kishore |
| 2004/0059653 A1 | 3/2004 | Verkuylen et al. |
| 2004/0064402 A1 | 4/2004 | Dreyer et al. |
| 2004/0107161 A1 | 6/2004 | Tanaka et al. |
| 2004/0122717 A1 | 6/2004 | Handcock |
| 2004/0215553 A1 * | 10/2004 | Gang et al. .................... 705/38 |
| 2004/0215555 A1 * | 10/2004 | Kemper et al. ................ 705/38 |
| 2004/0220885 A1 * | 11/2004 | Salzmann et al. ............. 705/80 |
| 2004/0249656 A1 * | 12/2004 | Schwerin-Wenzel et al. ... 705/1 |
| 2005/0096926 A1 * | 5/2005 | Eaton et al. .................... 705/1 |
| 2005/0273423 A1 * | 12/2005 | Kiai et al. ..................... 705/38 |
| 2006/0173726 A1 * | 8/2006 | Hall et al. ...................... 705/8 |
| 2006/0190370 A1 * | 8/2006 | Halpin ......................... 705/35 |
| 2006/0190394 A1 * | 8/2006 | Fraser et al. .................. 705/38 |
| 2007/0112788 A1 * | 5/2007 | Kobza et al. .................. 707/10 |

FOREIGN PATENT DOCUMENTS

| | | |
|---|---|---|
| JP | 2002007701 | 1/2002 |
| JP | 2002259696 | 9/2002 |
| JP | 2002288426 | 10/2002 |
| JP | 2003223559 | 8/2003 |
| WO | WO 9948036 | 9/1999 |
| WO | WO 0021011 | 4/2000 |
| WO | WO 0062209 | 10/2000 |
| WO | WO 0075833 | 12/2000 |
| WO | WO 0116845 | 3/2001 |
| WO | WO 0118718 | 3/2001 |
| WO | WO 01/27832 | 4/2001 |
| WO | WO 0133461 | 5/2001 |

| | | |
|---|---|---|
| WO | WO 0139079 | 5/2001 |
| WO | WO 01/41019 | 6/2001 |
| WO | WO 0150318 | 7/2001 |
| WO | WO 0163445 | 8/2001 |
| WO | WO 0163446 | 8/2001 |
| WO | WO 0163534 | 8/2001 |
| WO | WO 0180123 | 10/2001 |
| WO | WO 0198999 | 12/2001 |
| WO | WO 02/06989 | 1/2002 |
| WO | WO 0208855 | 1/2002 |
| WO | WO 0223443 | 3/2002 |
| WO | WO 02/084925 | 10/2002 |
| WO | WO 02093286 | 11/2002 |
| WO | WO 03009152 | 1/2003 |
| WO | WO 03/071380 | 8/2003 |
| WO | WO 03/071388 | 8/2003 |

OTHER PUBLICATIONS iDatix(R) Helps NetBank Automate 25 Million Mortgage Documents in One Year PR Newswire. New York: Oct. 20, 2004. p. 1.*

Fannie Mae, "Guide to Underwriting with Desktop Underwriter®", Sep. 2002; 63 pgs.

Edocs, "edocs Teams with Fannie Mae to Offer Lenders Online Account Management Solution," Press Release, Mar. 12, 2001, 2 pgs., edocs, Inc., USA.

Fannie Mae, "Fannie Mae Unveils MORNETPlus on the Web; Lenders Can Now Access Automated Underwriting and Other Mortgage Transaction Services on Fanniemae.com," Press Release, Mar. 23, 2000, 2 pgs., Fannie Mae, USA.

Fannie Mae, "Fannie Mae Announces MORNETPlus Connections; Now Provides Lenders with Access to the Largest Network of Service Providers on the Web for Appraisals, Flood Certificates, Title Insurance and Closing, and Escrow Services," Press Release, Apr. 18, 2001, 3 pgs., Fannie Mae, USA.

Fannie Mae, "Fannie Mae and First American Financial to Provide Lenders with Electronic Access to More Products on MORNETPlus Network; Appraisals, Flood Certificates, and Title Insurance in Offering," Press Release, Dec. 21, 1999, 2 pgs, Fannie Mae, USA.

Raines Franklin D., "Statement by Franklin D. Raines Chairman and CEO of Fannie Mae, Speech at 2003 Fannie Mae eBusiness Forum," Sep. 17, 2003, 6 pgs, Fannie Mae, USA.

Object Management Group, "Fannie Mae", CORBA Banking/Finance, Sep. 17, 2001, 2 pgs, Object Management Group, Needham, MA, USA.

Smith Tom, " E-Commerce Holds Keys to Home Ownership: Fannie Mae drives hug volumes of mortgage business to its e-marketplace," Internetweek.com, Undated, 5 pgs., Internetweek.com, USA.

Smith Tom , "Fannie Mae Ramps up Web Apps: Q&A with Julie St. John , Executive Vice President and Chief Technology Office and Michael Williams President of Fannie Mae e-Business," Internetweek.com, Undated, 11 pgs., Internetweek.com, USA.

Sun, "Success on Sun: Software Development Case Study Federal National Mortgage Association (Fannie Mae)," Mar. 1995, 10 pgs, Sun, USA.

Raines Franklin D., " Speech by Franklin D. Raines Chairman and CEO of Fannie Mae, Fannie Mae and the Mortgage Industry in the E-Commerce Age," May 8, 2000, 20 pgs., Fannie Mae, USA.

Williams Michael, "Technology and Other Keys to the Boom in Refinancing," American Banker, Apr. 20, 2003, 3 pgs, vol. 168, Issue 63, p. 8., American Banker USA.

Breakthroughs in Mortgage Banking: Looking Toward the Future, Real Estate Finance Press, Mortgage Bankers Association of America, 1996, pp. 5-1 -5-8, ISBN 1-57599-016-4, Jess Lderman, Editor.

Fannie Mae, "Delivering Loans for MBS", 1996, 138 pages, Fannie Mae, Washington, DC, USA.

Fannie Mae, "Guide to Underwriting with Desktop Underwriter", Oct. 1997, 152 pages, Verison 4.0, Fannie Mae, Washington, DC, USA.

Fannie Mae, "MORNET MBS Pool Submission System User's Guide", Sep. 1998, 259 pages, Version 5.3, Fannie Mae, Washington, DC, USA.

Fannie Mae, "Making Good Delivery A Guide to Delivering Loans for Cash and MBS", 1994, 121 pages, Fannie Mae, Washington, DC, USA.

Fannie Mae, "MORNET Cash Delivery System User's Guide", Nov. 1997, 177 pages, Version 2.6, Fannie Mae, Washington, DC, USA.

Fannie Mae, "Delivering Loans for Cash", 1997, 96 pages, Fannie Mae, Washington, DC, USA.

Fannie Mae, "MORNET Manager User's Guide", Nov. 1998, 187 pages, Version 3.0, Fannie Mae, Washington, DC, USA.

Fannie Mae, "MORNET Servicing Support System User's Guide", Dec. 1998, 370 pages, Fannie Mae, Washington, DC, USA.

Fannie Mae, "Selling", 1995-2002 et al, 1119 pages, Fannie Mae, USA.

Fannie Mae, "Investor Accounting: Cash", 1996, 132 pages, Fannie Mae, Washington, DC, USA.

Fannie Mae, "Secondary Marketing: Cash", 1997, 81 pages, Fannie Mae, USA.

Fannie Mae, "General Servicing Fundamentals", 1996, 174 pages, Fannie Mae, USA.

Laser Overview, May 1993, chapters 1-18.

Fannie Mae, "Servicing Guide", 1995-2002 et al, 319 pages, Forward, Table of Contents, Sections III, IX, X, and XI, Fannie Mae, USA.

* cited by examiner

Condo Project Tracker

Condo Project Name

Zip code: 20009 — 370
Change Zip Code

Type project name: Beekm — 350

Select from list:
- Beekman Place, 1600 Belmont Street, NW #s 1-250, Washington, DC 20009 (ID 70059)
- Beekman Place, 1610 Belmont Street, NW #s 250-300, Washington, DC 20009 (ID 70060)
- Beekman Place, 1620 Belmont Street, NW #s 300-350, Washington, DC 20009 — 360
- Beekman Place, 1630 Belmont Street, NW TOWERS, Washington, DC 20009 (ID 70061)
- The Beckman, 1800 Belmont Street, NW, Washington, DC 20009 (ID 70062)
- Beech-Floyd, 1400 Euclid Street, NW, Washington, DC 20009 (ID 70063)
- Place B, 1 Crescent Street, NW #s A-E, Washington, DC 20009 (ID 70064)

380 — OK   < Back   Cancel

FIG. 3b

Condo Project Tracker

Condo Project Name - Add New

| | | |
|---|---|---|
| Type project name | Beekman's Place — 401 | |
| Project Address | 43 Pennsylvania Ave. NW — 402 | |
| Project City, State, Zip | 403 — Washington / DC / 404 / 20009 — 405 | |
| Developer | 406a — Portman | Developer phone — 202-755-7555 — 406b |
| Lender Contact | 407a — B.Bishop | Lender Contact phone — 202-555-7777 — 407b |

408 → OK    <Back    Cancel

Zip code: 20009
Change Zip Code

Home  Legal  Contact Us    Log out

Condo Project Tracker

Second Phase - Condo Project Lender-Delegated Review Eligibility Checklist

Beekman Place, 1620 Belmont Street, NW #s 300-350, Washington, DC 20009

NEW Project

General information

- ☑ The project is NOT a coop
- ☑ The project is NOT manufactured housing
- ☑ The project does NOT have over 150 units
- ☑ The subject project is NOT a leasehold
- ☑ The subject project is NOT a Non-gut rehab
- ☑ No adverse environmental conditions (such as, but not limited to, hazard wastes, toxic substances, etc.) on the site, or in the immediate vicinity of the subject property

[OK]  [<Back]  [Cancel]

Home | Legal | Contact Us

Log out

FIG. 6b

Condo Project Tracker

Home    Legal    Contact Us

Log out

Third Phase - Condo Project Lender-Delegated Review Eligibility Checklist

Beekman Place, 1620 Belmont Street, NW #s 300-350, Washington, DC 20009

NEW Project

Completion
- ☑ A single investor (excluding developer) does not own more than 10% of the units
- ☑ All units in subject are substantially complete
- ☑ Common areas are substantially complete, or if not, have a bond letter of completion assurance from the builder/construction lender   More info Add comments about completion Finance and reserves
- ☑ Adequate HOA budget and sufficient replacement reserves   More info
- ☑ If project has more than 20 units, Fidelity Bond Coverage of $ [    ]

Add comments about finances, HOA reserves

[OK]   [<Back]   [Cancel]

FIG. 6c

Condo Project Tracker

Home | Legal | Contact us

Log out

**Third Phase - Condo Project Lender-Delegated
Review Eligibility Checklist**
Beekman Place, 1620 Belmont Street, NW #s 300-350, Washington, DC 20009

NEW Project

Insurance
- ☑ Hazard Insurance covers 80% replacement or have 1% deductable
- ☑ Flood Insurance covers 80% replacement or have a 1% deductable
- ☑ Liability Insurance of %1,000,000

Add comments about insurance

Appraisal
- ☑ Appraisal shows stable or increasing property value
- ☑ Appraisal shows Demand/Supply to be less than or equal to 6 months
- ☑ Appraisal shows Marketing time less than or equal to six months Add comments about appraisals

[OK] [<Back] [Cancel]

FIG. 6d

Condo Project Tracker

Condo Project Lender-Delegated Eligibility

Beekman Place, 1620 Belmont Street, NW #s 300-350, Washington, DC 20009

The undersigned hereby certifies that the lender has underwritten and recommends the project for acceptance by Fannie Mae and that, to the best of his or her knowledge and belief, the information and statements contained in this application are true and correct. Inform us if any of the above referenced statements are no longer true and correct. The checklist shall not supercede Selling Guide requirements.

| Name Underwriter | Title | Phone |
|---|---|---|
| Jocelyn Byrne  This is not me | Underwriting Specialist | 202-752-7502 |

Electronic Signature
☑ Jocelyn Byrne

[OK]  [<Back]  [Cancel]

CONDO PROJECT ELIGIBLE

FIG. 6e

Condo Project Tracker

Condo Project Lender-Delegated Eligible (in original)

Beekman Place, 1620 Belmont Street, NW #s 300-350, Washington, DC 20009
CONDO PROJECT ELIGIBLE - next 30 days
EXPIRES 10/14/2004

Project Data

| | | |
|---|---|---|
| Name Underwriter | Title | Phone |
| Jocelyn Byrne | Underwriting Specialist | 202-752-7502 |
| Name developer | Subject property type | New or Existing |
| Portman | 50 unit | New |

[OK]  [<Back]  [Cancel]  [Print]

Condo Project Tracker  *Investor User View*

Home　Legal　Contact Us

Log out — (860 Messages, 850 Markets, 840 Lenders, 830 Users, 820 Projects, 810 Reports)

Log-in

User id　[f1ujnb] — 805
Password　[********] — 806

Click here if you forgot your password
Click here if you forgot your userid

[Login] — 807　　[Cancel]

All
EBC
NBC
WBC

FIG. 10

Expedited Report

Investor User Report: Shows all condo projects that are in the lender-delegated review process during a specific time period.

— 1110

— 1120

| Lender Name | Project Name | Phase Address Line 1 | Phase City Name | Phase State Code | Phase Postal Code | Last Update Date | Shared Status Code |
|---|---|---|---|---|---|---|---|
| Lender 1 | Bella Rose Phase 1 | 5590 Anywhere | My Town | MD | 20065 | 12/12/1998 | Not Eligible for Lender-Delegated Review |
| Lender 2 | Bella Rose Phase 2 | 6000 Anywhere | My Town | MD | 20065 | 10/03/1998 | Not Eligible for Lender-Delegated Review |
| Lender 3 | Blue Bonnett Towncenter Phase 1 | 65413 Dancing Drive | My Town | MD | 20065 | 12/31/2000 | Lender-Delegated Review Certification Expired |

FIG. 10c

Duplicates Report
Investor User Report: Shows all condo projects that we suspect are duplicates.

| Original Project | | | | | | Duplicate Project |
|---|---|---|---|---|---|---|
| Project Name | Phase Address Line 1 | Phase City Name | Phase State Code | Phase Postal Code | Shared Status Code | Project Name |
| Bella Rose Phase 1 | 5590 Anywhere | My Town | MD | 20065 | Not Eligible | Bella Rose Phase 1 |
| Bella Rose Phase 2 | 6000 Anywhere | My Town | MD | 20065 | Not Eligible | Bella Rose Phase 2 |
| Blue Bonnett Towncenter Phase 1 | 65413 Dancing Drive | My Town | MD | 20065 | Certified for Lender-Delegated Review | Blue Bonnett Towncenter Phase 1 |

FIG. 10e

Condo Project Tracker

[Projects] [Reports] [Notifications] [Forms] [Terms of Use Agreement] [Help]     Log Out

Report Type          Description

Lender Project           Lorem ipsum dolor sit amet, consectetuer adipiscing elit. Vivamus facilisis, tellus non
                         pharetra aliquam, neque nunc blandit sem, sit amet commodo dui risus a augue.

Lender's User            Lorem ipsum dolor sit amet, consectetuer adipiscing elit. Vivamus facilisis, tellus non
                         pharetra aliquam, neque nunc blandit sem, sit amet commodo dui risus a augue.

Published 1028           Lorem ipsum dolor sit amet, consectetuer adipiscing elit. Vivamus facilisis, tellus non
                         pharetra aliquam, neque nunc blandit sem, sit amet commodo dui risus a augue.

FIG. 11b

| | Lender Report: Shows a lender all of its condo projects. | | | | | |
|---|---|---|---|---|---|---|
| Project Name | Phase Address Line 1 | Phase City Name | Phase State Code | Phase Postal Code | Last Update Date | Shared Status Code |
| Bella Rose Phase 1 | 5590 Anywhere | My Town | MD | 20065 | 12/12/1998 | Not Eligible for Lender-Delegated Review |
| Cottages at Dublin Ranch Villages Phase 3 | 125 A Street | My Town | MD | 20065 | 03/27/1998 | Incomplete Certification Process |
| Cottages at Dublin Ranch Villages Phase 4 | 225 B Street | My Town | MD | 20065 | 03/17/1998 | Ineligible for Lender-Delegated Review Certification |

FIG. 11c

SYSTEM AND METHOD FOR MANAGEMENT OF DELEGATED REAL ESTATE PROJECT REVIEWS

FIELD OF THE INVENTION

The present invention relates generally to systems and methods for facilitating investor acceptance of real estate projects with which one or more lenders are involved, for maintaining data concerning reviews of real estate projects; for tracking delegated reviews of real estate projects, and/or for performing other operations in connection with reviews of real estate projects.

BACKGROUND

Condominiums ("condos") are a major entry point into homeownership for first-time buyers, and an affordable housing option in many high cost geographical areas. Many people achieve the dream of home ownership for the first time through the purchase of a condo. A lender's ability to broaden its reach into the condo market can have a significant impact on its ability to meet underserved borrower's needs for affordable housing.

Condo loans, like loans for other housing, are often sold by lenders into the secondary mortgage market. This allows capital from the financial markets to flow into the housing market, and improves the overall flow of capital to mortgage sectors, thereby reducing mortgage costs for consumers and enabling more consumers to purchase condos or other housing. Typically, lenders and secondary mortgage market investors work together in advance of closing to ensure that a given condo loan will be suitable for sale to the secondary mortgage market investor (i.e., assuming the lender is planning on selling the condo loan in the secondary mortgage market). Additionally, lenders and mortgage market aggregators work together to determine whether a condo loan should be made. For the case of either type of investor, with a condo loan, there may be both a review of the corresponding condo project, and a review of the condo loan. For example, the investor may review characteristics of a condo project in order ensure that the condo project meets predetermined criteria and make a list of accepted condo projects available to lenders. When a consumer comes to a lender for a loan, the lender may review the list of accepted condo projects to confirm that it is on the accepted list. This provides the lender with a level of assurance that the investor will not subsequently refuse to purchase the condo loan on the basis that the condo project does not meet its criteria. Assuming the condo project is on the accepted list, the lender may then evaluate the credit characteristics of the borrower (e.g., using an automated underwriting engine made available by the investor) to determine whether a loan should be made to the borrower. If the condo project is not on the list, the lender may request the investor to conduct a review of the condo project to determine whether it meets the predetermined criteria. Once a condo project has been reviewed and accepted, additional loans may be made for additional condos in the condo project without necessarily having to duplicate the condo project review each time. Even if the lender is planning on retaining the condo loan in its own portfolio (i.e., and not selling it to another secondary mortgage market investor), the lender may still wish to review the condo project to ensure the condo project meets with the lender's own criteria.

The review process undertaken by investors to review condo project characteristics is time-consuming, sometimes delaying the time to place consumers in a home. As a result, there is a need for a system and method that facilitates acceptance of condo projects. There is also a need for a system and method that would allow investors to delegate to lenders the responsibility for reviewing condo projects. It will be appreciated that, while certain functions and advantages are described, the teachings herein may be used to implement systems which achieve other functions and advantages, without necessarily achieving any of those described herein.

SUMMARY OF THE INVENTION

According to a first preferred aspect, a data processing system comprises a database, lender user interface logic, and investor user interface logic. The database is configured to store information regarding a plurality of real estate projects, including projects which are under development and projects which are completed. The lender user interface logic is configured to provide a lender user interface accessible to lenders. The lender user interface logic provides the lenders with access to the database to permit the lenders to add information in the database concerning the plurality of real estate projects. The investor user interface logic is configured to provide an investor user interface accessible to an investor. The investor has relationships with the lenders in which the investor provides funding for the mortgage loans in exchange for an interest in the mortgage loans. The investor interface logic is configured to permit the investor to accept a real estate project and to track the information added in the database by the lenders.

According to a second preferred aspect, a data processing system comprises lender user interface logic and a database. The lender user interface logic is configured to provide a lender user interface accessible to lenders. The database is accessible to the lenders by way of the lender user interface logic. The database implements a shared information repository storing shared information concerning the plurality of real estate projects. The shared information is shared by multiple ones of the lenders with each of the multiple lenders having the ability to add to and edit the shared information.

Other features and advantages of the present invention will become apparent to those skilled in the art from the following detailed description and accompanying figures. It should be understood, however, that the detailed description and specific examples, including figures, while indicating various embodiments of the present invention, are given by way of illustration and not limitation. Many modifications and changes within the scope of the present invention may be made without departing from the spirit thereof and the invention includes all such modifications.

BRIEF DESCRIPTION OF THE DRAWINGS

FIG. 3b is a screenshot of a graphical user interface enabling a lender user to search condo projects in the database.

FIG. 4 is a screenshot of a graphical user interface for adding information about a new condo project to the database.

FIG. 6a is an exemplary embodiment of a screenshot of a graphical user interface enabling a lender user to enter information during the first phase of the acceptance process.

FIG. 6b is a screenshot of a graphical user interface enabling a lender user to enter information during the second phase of the acceptance process.

FIG. 6c is a screenshot of a graphical user interface enabling a lender user to enter information during the third phase of the acceptance process.

FIG. 6d is a screenshot of a graphical user interface enabling a lender user enter information during the third phase of the acceptance process.

FIG. 6e is a screenshot of a graphical user interface enabling a lender user to enter information during the acceptance process and to certify that the entered information is true.

FIG. 6f is a screenshot of a graphical user interface informing a lender user of condo project acceptance and a corresponding expiration date for the acceptance.

FIG. 7 is a screenshot of a graphical user interface enabling an investor user to log into the system.

FIG. 10 is a screenshot of a graphical user interface enabling an investor user to edit a condo project status.

FIG. 10c is an exemplary report indicating all condo projects that are undergoing lender-delegated review during a specified time period.

FIG. 10e is an exemplary report indicating the condo projects that are likely to be duplicate entries.

FIG. 11b is a screenshot of a graphical user interface enabling a lender user to generate reports.

FIG. 11c is an exemplary report indicating the condo projects with which a lender user is involved.

DETAILED DESCRIPTION

Figure 1:
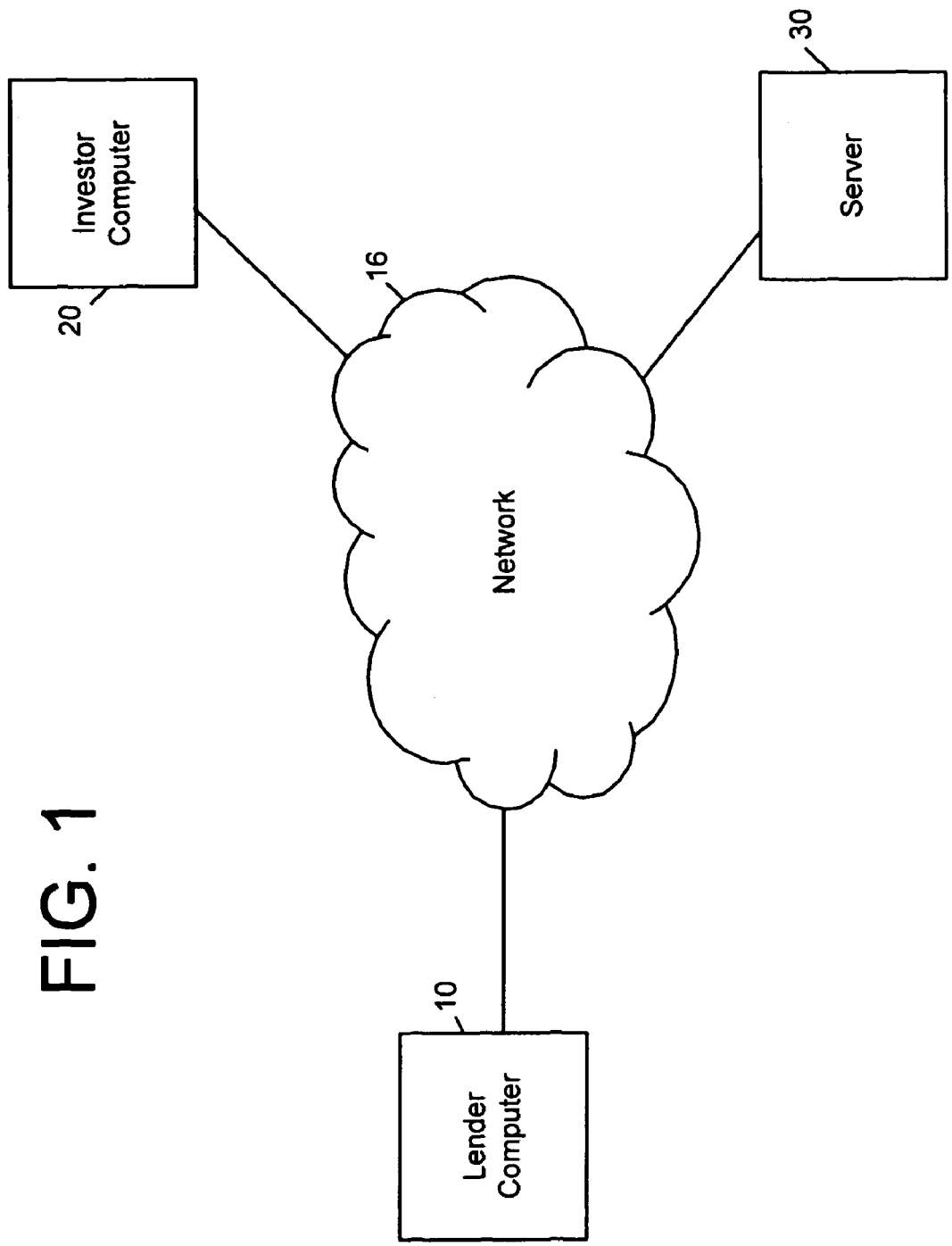
FIG. 1 is an illustration of a system for facilitating acceptance of condo projects and performing other operations in connection with reviews of condo projects.

An exemplary embodiment of the invention is described below with reference to drawings. These drawings illustrate certain details of specific embodiments that implement the systems, business methods and computer program products of embodiments of the present invention. However, describing the embodiments with drawings should not be construed as imposing on the embodiments any limitations that may be present in the drawings.

FIG. 1 is an illustration of a project management system according to an exemplary embodiment. Although the exemplary system is directed toward facilitating the review of condo real estate projects (e.g., with attached and/or detached condos), other types of real estate are also envisaged and the system may likewise be employed for facilitating the review of other types of residential and commercial properties. For example, the system may be used in connection with cooperatives, Planned Unit Developments (PUDs), and manufactured housing.

The system comprises a server 30 in a network 16, a database processing system 65 (FIG. 2) implemented in stored program logic in the server 30, one or more lender computers 10, and one or more investor computers 20. Each lender computer 10 is located at a lender location and each investor computer 20 is located at an investor location, which may or may not be remote from the server 30. In the system of FIG. 1, it is assumed that the server 10 is associated with (e.g., operated by) the investor and is used in connection with condo loans proposed by a variety of different lenders. Accordingly, different ones of the lender computers 10 may be associated with different lenders. To use the system 65, users communicate over the network 16 with the server 30 to log into the server on which the system 65 is implemented.

As used herein, "lender" means a financial institution that makes loans to a borrower to fund the purchase of a property. As used herein, "investor" means a financial institution that purchases loans from the lender, or otherwise provides funding for the loans, either with cash or in another form of payment (e.g., mortgage-backed securities), and to hold in its own investment portfolio and/or to resell to other investors in the financial markets. An "investor" may also include a lender that makes a loan and holds the loan in its own portfolio either for investment or for sale at a future date.

In an exemplary system, each lender has at least one lender computer 10 which runs software that is capable of sending textual information to the system 65 implemented on the server 30. For example, the lender computer 10 may comprise a web browser program (e.g., Internet Explorer) which may be used to access a web-based user interface made available to the lender computer 10 by user interface logic on the server 30. The web-based interface may be made available to the lender computer 10 via the network 16 which, in this instance, may comprise the Internet. The lender computer 10 may also contain software capable of one or more of the following: receiving electronic files from a scanner or other mechanical device connected to the lender computer that is capable of receiving documents in paper version and converting the documents into electronic files, printing electronic versions of received documents, faxing electronic versions of paper documents, uploading or downloading electronic versions of paper documents to or from an online database or FTP location associated with the server 30. The information may be sent from the lender computer 10 to the server 30 via the network 16.

Each user associated with the investor has at least one investor computer 20. The investor computer 20 may have the same functionality as the lender computer 10 and may be implemented in the same manner as the lender computer (e.g., as comprising a browser program). However, assuming different access rights are assigned to different users associated with different entities, the functions that a user may be able to perform may vary in accordance with the user's access rights.

As will be described in greater detail below in connection with FIG. 2, the system 65 may comprise program logic configured for use in maintaining, editing, searching a database of information, generating reports based on the information in the database, sending notifications (i.e. messages over network 16 to a lender computer 10 and/or an investor computer 20), and/or enabling a user to view contents of specified portions of the database. The system 65 may also comprise program logic configured for enabling lenders or investors to add new condo project information or update existing condo project information in a database, enabling lenders or investors to generate reports based on condo project information in the database, enabling lenders to obtain investor acceptance for condo projects for which information is present in the database, and/or enabling investors to track condo loans, as will be explained in the following paragraphs.

The project management system arrangement of FIG. 1 may be used to implement a system in which condo projects are susceptible to take one of multiple different paths, corresponding to different types and/or levels of review, depending on characteristics of the condo project. In each of the paths, it is assumed that the lender eventually intends to sell the loan to the investor. Once the sale of the loan from the lender to the investor occurs, the risk associated with the loan (e.g., the risk that the loan may go into default) transfers to the investor as part of the transfer of the loan itself. Accordingly, the investor may typically have criteria that it uses to assess the condo projects. The purpose of the condo project review is to ensure that the condo project meets the investor's criteria so that it is known whether the investor will be willing to purchase loans made on condos that are a part of the condo project in advance of the loans being made to borrowers. A separate loan level review of each loan may also be performed, such as through submission of the loan application for the borrower to an automated underwriting engine (not shown) which is operated by the investor and which is configured to generate an underwriting recommendation based on information contained in the loan application.

In the first review path, condo projects receive only a loan level review. For example, the condo project may be reviewed and it may be determined that the loan-to-value ratio of a loan that is to be secured by a condo unit is less than a predetermined threshold level.

In the second review path, condo projects receive a full review by the investor using a review process which may be labor-intensive. The second path may be used where factors are present that make it difficult to assess a condo project based only on the information that may be captured in a form questionnaire. As previously indicated, a limitation of this approach is that the high level of human involvement on the part of the investor slows down the process and limits the volume of condo loans that can be originated and, ultimately, slows down the pace at which consumers can achieve the dream of home ownership.

In the third review path, the investor delegates responsibility for reviewing the condo project to the lender. This arrangement allows the lender to assist with the process of reviewing the condo project, increases the volume of condo loans that may be originated, and, ultimately, speeds up the pace with which consumers can achieve the dream of home ownership.

The third review path is facilitated by the project management system of FIG. 1. In particular, the project management system of FIG. 1 may be used to facilitate acceptance of condo projects through the use of lender-delegated reviews. As will be seen below, a user interface may be provided that may be accessed by the lender. The lender may answer various questions about the condo project, and may represent/warrant the accuracy of the information provided. (Herein, the phrase "represent/warrant" is used to mean represent or warrant or both, "representations/warranties" is used to mean representations or warranties or both, and so on. For purposes of convenience, it is assumed in the descriptions of FIGS. 1-12 that both representations and warranties are made.) When the condo loans within an accepted condo project are sold to the investor, risk associated with the condo loans transfer to the investor as is typical. However, by the lender having made the project-level representations and warranties, the investor has recourse against the lender in the unlikely event that the lender has misrepresented aspects of the condo project. The system of FIG. 1 may also operate as the system of record in the transaction between the lender and the investor, at least with regard to representations and warranties made by the lender. The project management system of FIG. 1 also provides a collaborative tool that allows lenders and the investor, for example, to share information about condo projects and to leverage work performed by other users within the same lender organization. The tool also provides the investor with a way of tracking loan performance across lenders for various condo projects, and so on.

The project management system may provide an automated system and method of system operation that accurately and uniformly assesses the risk of condo projects and may provide lenders the ability to certify a condo project as one that meets investor acceptance criteria, such that the investor will later purchase loans secured by condo units that are a part of such condo project ("lender-delegated review"). The project management system may also provide an automated system enabling the investor to track and monitor the performance of condo projects accepted based on lender-delegated review and/or the performance of loans for condo units that are part of such projects, update information on new and existing condo projects being monitored by the investor, generate various reports for lenders and investors regarding the condo projects, search a condo project database, and so on.

The project management system assesses the risk of a condo project through established inquiries that may be evaluated using the system; and provides for investor acceptance of a condo project in accordance with predetermined criteria. Further, the project management system may enable the investor to track and monitor the performance of condo projects accepted based on delegated review. The system may also make the condo project review process more efficient, thereby decreasing condo loan origination costs making condo loans more affordable for consumers, and enabling consumers to achieve their dream of home ownership. The system may also make the condo project underwriting process more accurate and thereby decrease risks associated with underwriting condo projects. Finally, the project management system may provide an auditing trail with system-generated feedback and a mechanism for generating reports to get a complete view of the performance of condo loans for a condo project.

Figure 2:
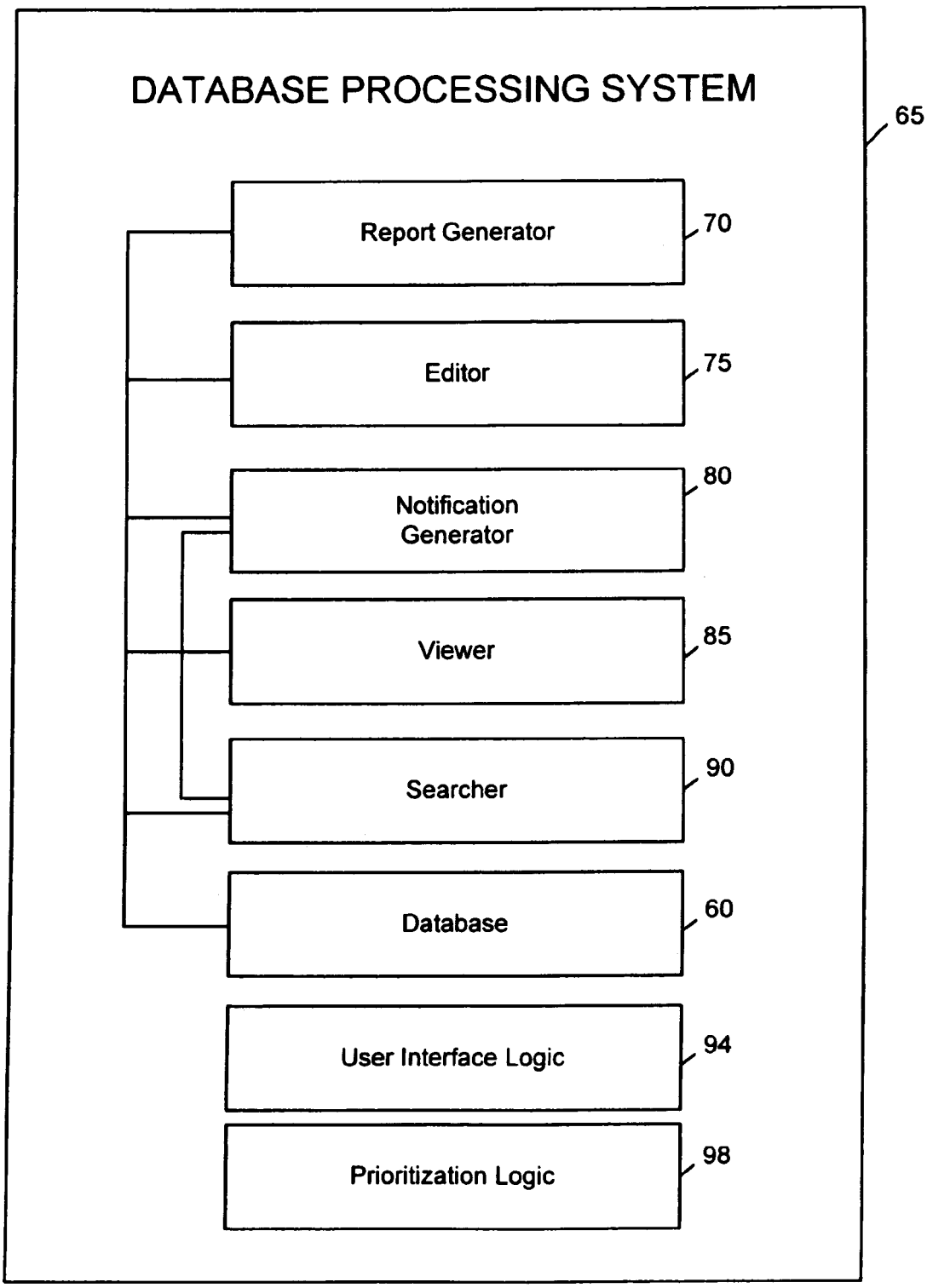
FIG. 2 is a block diagram depicting a server which implements the system of FIG. 1 in greater detail.

FIG. 2 is a block diagram of server 30 with program logic implementing the project management system of FIG. 1. The system comprises database processing system 65 which includes components performing various functions. In one embodiment, the database processing system 65 comprises a report generator 70, an editor 75, a notification generator 80, a viewer 85 a searcher 90 and a database 60. The database processing system 65 may be implemented in a computer comprising a microprocessor and memory with the stored program logic. The program logic may include user interface logic used to provide the web-based user interfaces for the lenders and the investor.

A user may generate commands to be transmitted to the database processing system 65. The project management system may be designed such that access to various system functions (e.g., editing, generating reports and receiving notifications) will vary for a user depending upon the way that the user is identified, as dictated by the login and password that the user uses to log into the system. The system may be configured to have general users and administrative users. Within each category of general users and administrative users there may be different tiers of users, each tier of user having different system capabilities, such as standard administrative users and super administrative users with an elevated level of administrative access.

Database processing system 65 may be used to implement a shared repository of information concerning condo projects. The project management system may operate such that a lender can view basic information that is shared across all lenders located in the shared repository. For instance, all lenders can view information about a condo project on which they are accepting condo loans, such as address information, condo project identifier information, and so on. However, the shared repository may be configured such that information that is required to be represented and warranted by the lender may not be shared across lenders. The investor, on the other hand, may view some or all of the data entered for some or all of the different lenders for a particular condo project. This permits the investor to take a more global view of the condo projects and to take various actions as a result of the viewed data. For instance, an investor user may be provided with the ability to view all condo projects and examine lender concentration within a condo project. Again, program logic may be included in the project management system to issue a notification if a large number of condo loans are concentrated at a given project. This would allow the investor to decide to give the condo project an elevated level review.

A lender general user may have certain access rights. For example, a lender general user may have access rights to add and update condo projects, generate reports specific to the lender general user, provide information for lender-delegated review acceptance, and receive system messages. FIG. 11c is an exemplary report for a lender user indicating the condo projects with which the lender user is involved.

The database processing system 65 may be configured to receive commands from users on the network 16, and process data located in the database 60 accordingly. The database processing system 65 may be employed to generate reports, add new condo project information or update existing condo project information in the database 60, or generate message notifications to lender users or investor users.

Figure 3:
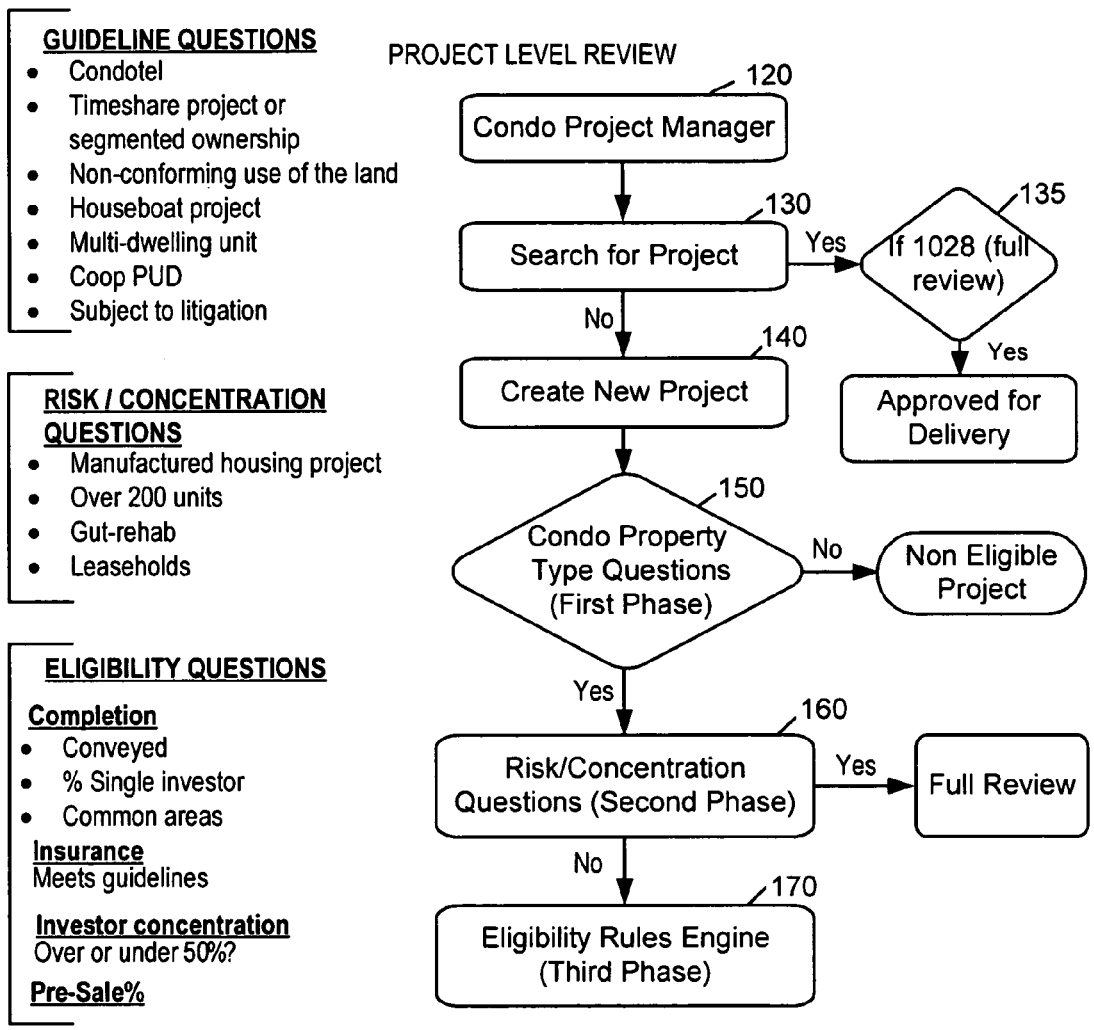
FIG. 3 is a flowchart illustrating an exemplary condo project review process.

FIG. 3 is a flowchart illustrating an exemplary process for reviewing a condo project, including determining a level of review that should be given to the condo project. The process starts at block 120 with a condo project that needs to be reviewed.

Figure 3A:
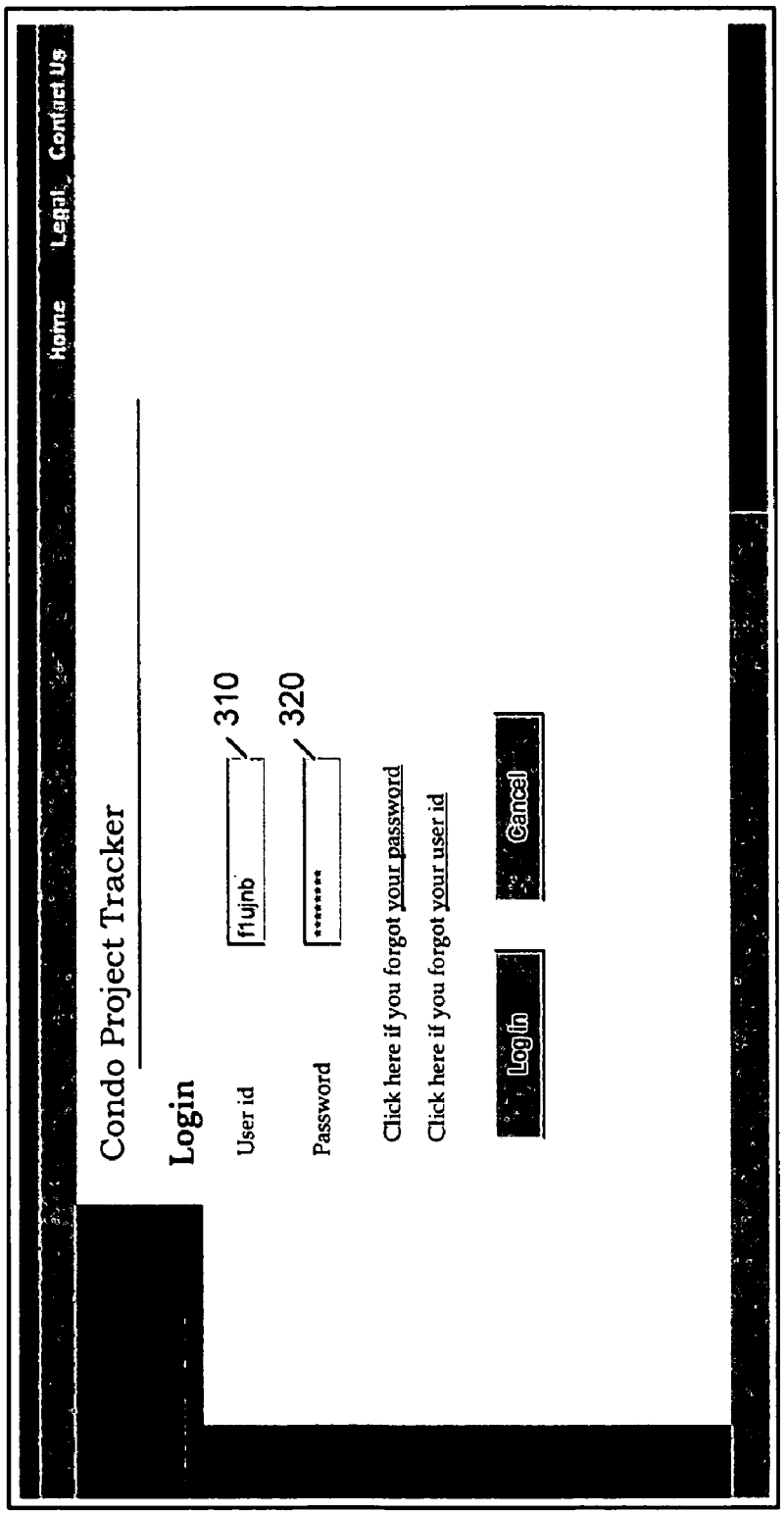
FIG. 3a is a screenshot of a graphical user interface enabling a lender user to log into the system.
Figure 5:
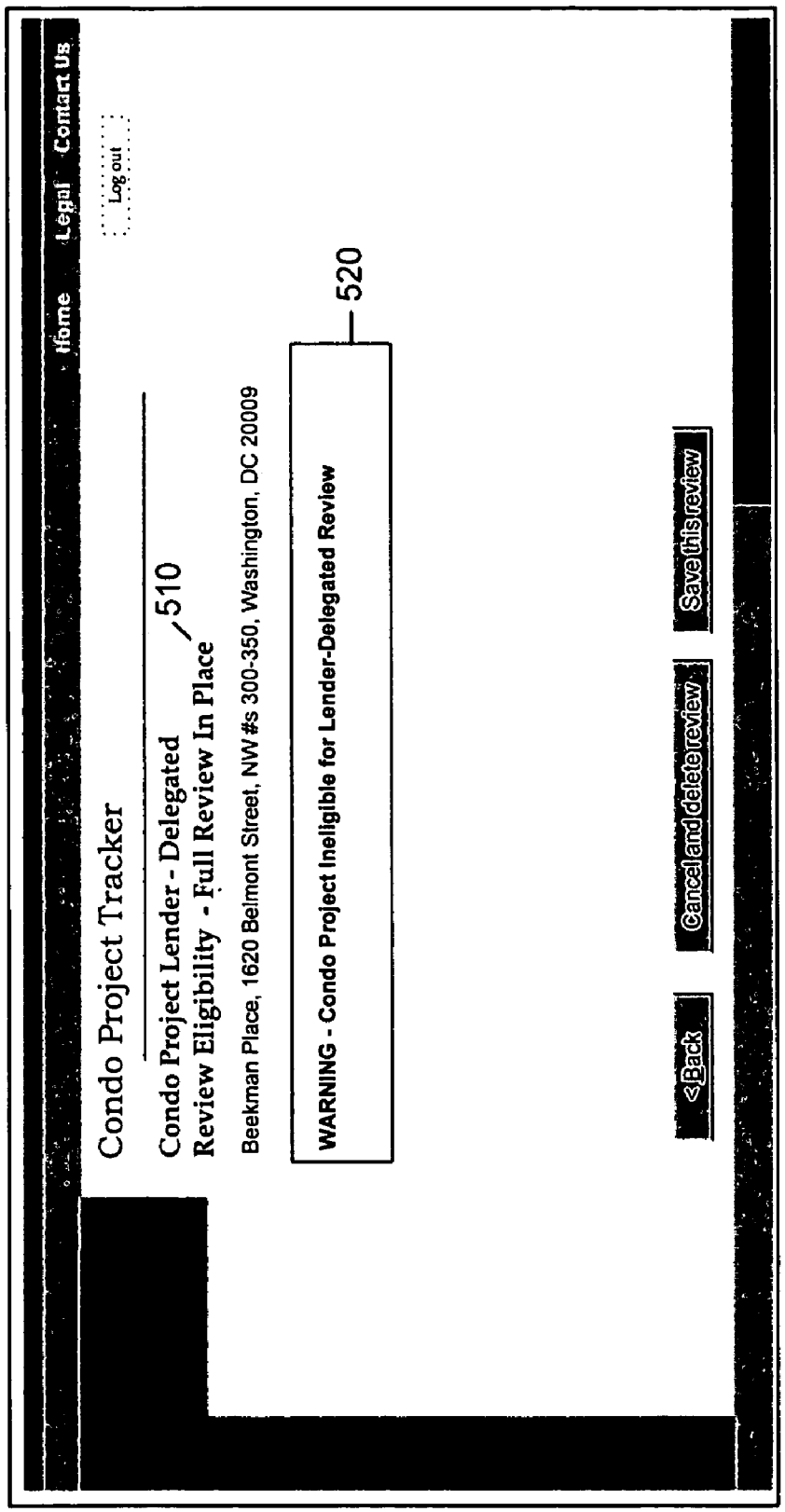
FIG. 5 is a screenshot of a graphical user interface indicating that a condo project is ineligible for lender-delegated review.
Figure 11A:
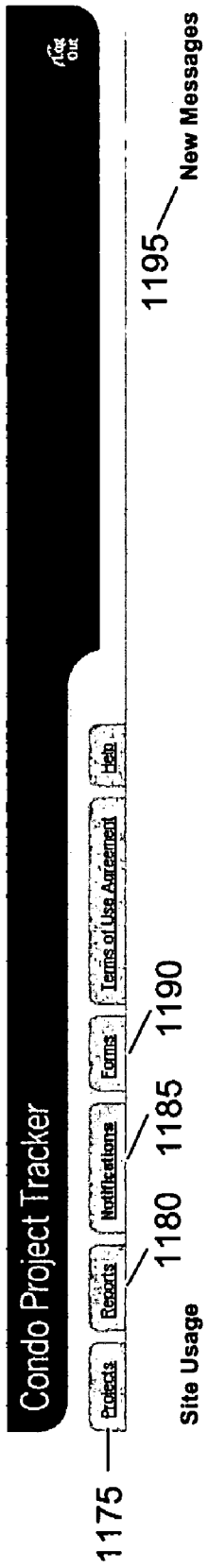
FIG. 11a is a screenshot of a graphical user interface of a homepage to which the lender user may be taken upon logging into the system.

The lender user enters the project management system of FIG. 1, as indicated by block 120. FIG. 3a is a screenshot of a graphical user interface enabling a lender user to log into the system, and FIG. 11a is a screenshot of a graphical user interface of a homepage to which the lender user may be taken upon logging into the project management system. In one exemplary embodiment of a login screenshot, the graphical user interface displays FIG. 3a and a user may enter a user name and password at the USER ID dialog box 310 and the PASSWORD dialog box 320, respectively. The user name and password entered by the user are used by the server 30 to determine whether the user is a general user or an administrative user and whether the user is a lender user or an investor user. After entering a user name and a password, the user may depress a log in button to submit the user name and password. If the entries in 310 and 320 indicate an authorized user, the server 30 enables the user to login and takes the user to the corresponding page according to the user's access rights.

Referring back to FIG. 3, at step 130, the lender user is provided with access to the database processing system 65 and is permitted to search for the condo project. Through the search, the lender user can locate a condo project which may already have been entered into the system, either by that lender or by another lender. The search may be supported by search logic 90 associated with the database 60 of FIG. 2. The user may submit a request including identifying information for the condo project. The search logic 90 may take any number of steps and permutations of steps in order to formulate a search of the contents of the database 60.

An exemplary search that the lender user can make when attempting to locate a condo project is a condo project name search as shown in FIG. 3b. In one exemplary embodiment, the lender user may perform a condo project name search by entering all or part of the condo project name into the Type project name dialog box 350. The lender user may optionally enter the zip code of the condo project into the Zip code dialog box 370 to more specifically target his condo project of interest. Next, the lender user may depress the OK button 380, which will generate a search and produce search results in the SELECT FROM LIST dialog box 360. The lender user may identify his condo project of interest, if it appears, and select it by again clicking the OK button 380, and the lender and status for the condo project will be displayed on a new page.

If the condo project is returned in the search results, the condo project may be subject to a previously-determined level of review that will be indicated as the status of the condo project. A condo project status may indicate whether the condo project is one that a lender may review. For example, referring to FIG. 3, as indicated at step 135, the search may result in an indication that the condo project has been previously-designated as subject to full review by the investor (and is therefore ineligible for lender-delegated review). Upon selecting a condo project that is subject to full review, the lender user will be taken to the graphical user interface illustrated in FIG. 5. As indicated at location 510, the particular condo project that was searched is already subject to a full review and as shown at box 520, is ineligible for lender-delegated review. Once a condo project has passed the full review, the results of the successful review may be leveraged in connection with subsequent loans (i.e., the subsequent loans may be accepted for delivery without further review of the condo project). The results may be leveraged both by the lender for whom the review was originally performed and by other lenders. If a condo project has been put into the system, information regarding the fact that the condo project has passed the full review is made available to the other lenders via the system.

Referring again to FIG. 3, in step 140, if the condo project is not currently in the database, the lender user may create a new condo project in the database. A user may employ the database processing system 65 to add new information or update existing information in the database 60. The editor 75 may support a user's editing of the information in the database 60. The editor 75 may edit the selected set of database dialog boxes through the selection or entry of input data by a user via the database processing system 65. The editing may include, but is not limited to, adding a condo project to the database, making condo project representations and warranties regarding a condo project, supplementing or changing existing condo project information or changing a status of a condo project. The new condo project information or updated existing condo project information can comprise information, lender information, and so on.

FIG. 4 is an embodiment of a screenshot of a graphical user interface that a lender user may use to create information regarding a new condo project in the database by adding a condo project in the database. The lender user may add information related to the geographical location of the condo project, the condo project developer and the lender.

In one exemplary embodiment illustrated in FIG. 4, a lender user may add a new condo project by entering the name of the condo project, street address, city, state and zip code in the following corresponding dialog boxes: TYPE PROJECT NAME 401, PROJECT ADDRESS 402, PROJECT CITY 403, CITY 404 and ZIP 405. The lender user may enter the developer's name and telephone number in the DEVELOPER dialog box 406a and DEVELOPER PHONE dialog box 406b. After entering information in one or more of the dialog boxes, the lender user may depress the OK button 408 to add the information that was entered into the dialog boxes into the server database. Even if the lender user does not enter information in each and every dialog box shown in FIG. 4, any information that the lender user enters will be added to the database. Upon adding a new condo project, the database is updated with the information entered for the condo project and available to the investor and all the lenders for future searching, processing, etc.

Referring to FIG. 3, in steps 150, 160 and 170, after entering a new condo project, the lender user may begin the process of applying for acceptance for the condo project. The process comprises three phases of questions which elicit information from the lender to allow prioritization rules to be used to assess the data to determine if the condo project should be accepted. The first phase of questions relates to the type of condo project to be accepted. The second phase of questions relates to other property related questions for the condo project. The third phase of questions relates to insurance, financing and appraisal information for the condo project. In each case, the lender moves to the next phase of the process after the questions in the previous phase are successfully completed and the information provided permits the lender to move to the next phase. As will be appreciated, different or additional phases may also be used, and/or different questions may be asked within each phase. The information entered in steps 150-170 is stored in the database but is not shared between the lender users. By not permitting sharing of this information, the system flags for the investor situations where reasonable minds might differ as to how certain questions could be answered, allowing the investor to review the situation for itself. Also, as described below, the condo project information entered in steps 150-170 is represented and warranted to be accurate, thereby providing further guarantees as to the accuracy of the information entered in steps 150-170.

Figure 6A:
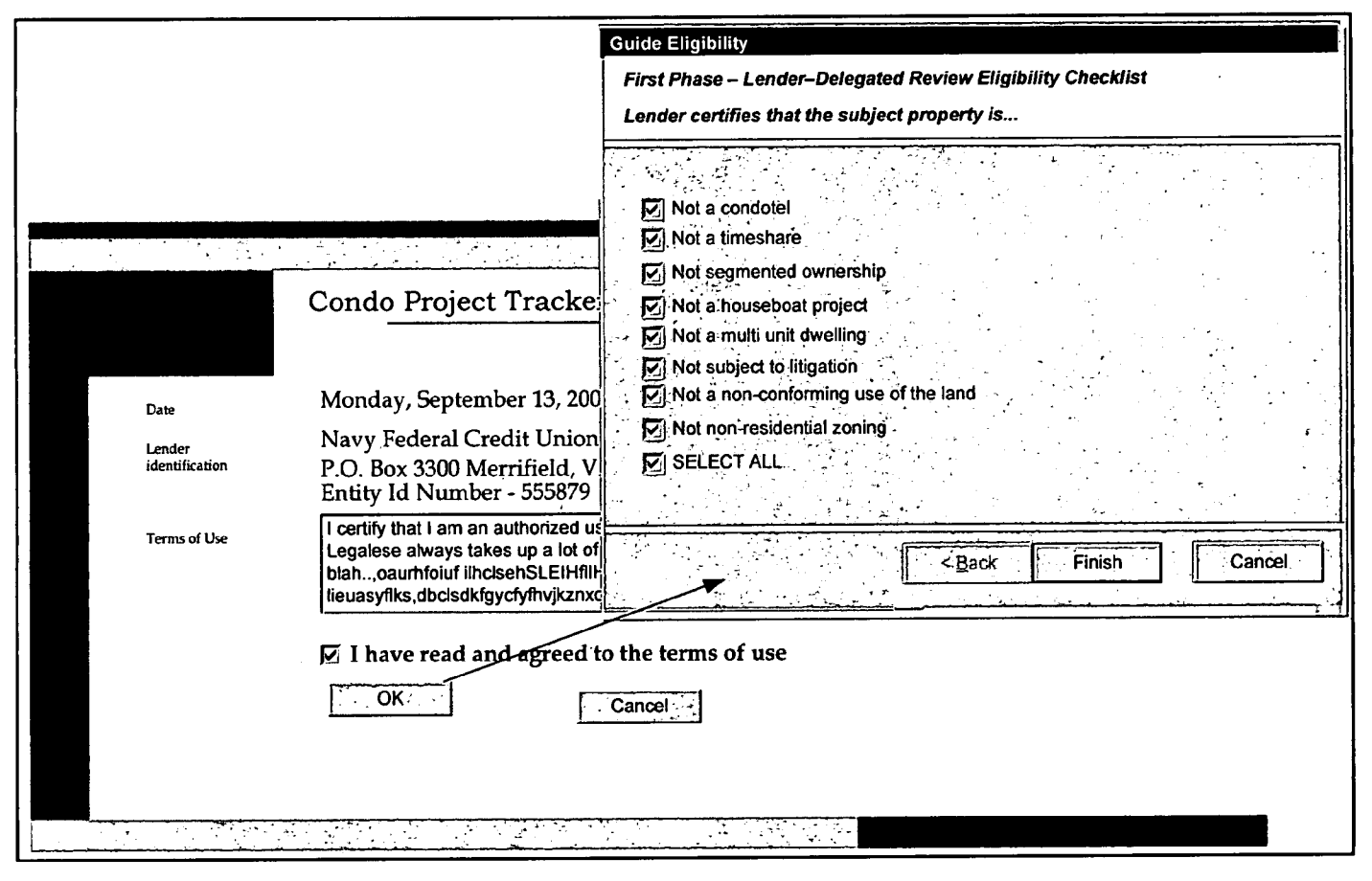

FIG. 6a is an exemplary embodiment of a screenshot of a graphical user interface enabling a lender user to enter information during the first phase of the acceptance process. The inquiries may be related to information including, but not limited to, whether the condo project is a timeshare, and whether the condo project is a non-conforming use of the land.

The lender user may submit the information concerning the type of project to be accepted in any number of ways, including, but not limited to, selecting dialog boxes that correspond to various conditions of the condo project. For example, the dialog boxes may correspond to whether the condo project is a timeshare and whether it is a non-conforming use of the land. This information is represented and warranted by the lender to be accurate. If the lender should make a representation or warranty that is not accurate or complete, the investor has recourse against the lender, such that the risk of default may shift back to the lender in connection with any such loans in which the representations and warranties were not accurate. For example, the lender may be required to repurchase the loan, such that the financial loss associated with any default impacts the lender and not the investor. The lender may submit its representations via entries to the project management system. Upon submitting the entries, the system implemented on the server 30 is configured to process the entries and determine whether the information submitted about the condo project cause it to fail the first phase of the process related to the condo project.

With reference to FIG. 3, if the lender user successfully completes the first phase of the lender-delegated review acceptance process, in step 160, the lender user may progress to the second phase of the process, which comprises submitting information regarding other property related questions for the condo project, as shown in FIG. 6b. During the second phase of the acceptance process, the lender enters information related to particular conditions including but not limited to whether the condo project is a leasehold, whether it is manufactured housing, and the number of units in the condo project development. Upon making the representations, the lender user submits the entries to the system. The lender user may do so in any number of ways, including, but not limited to, depressing a button.

With reference to FIG. 3, if the lender user successfully completes the second phase of the lender-delegated review acceptance process, in step 170, the lender user progresses to the third phase of the lender-delegated review acceptance process, which comprises making lender representations regarding the level of completion, insurance, appraisal, marketability and finances of the condo project. The lender user may make the representations in any number of ways, including, but not limited to, selecting dialog boxes that correspond to various conditions of the condo project. Exemplary embodiments are shown in FIGS. 6c and 6d. FIG. 6c is a screenshot of a graphical user interface enabling a lender user enter information during the third phase of the acceptance process. The third phase comprises inquiries regarding the level of completion of the condo project. In FIG. 6c, the lender user may make representations by checking dialog boxes corresponding to whether the condo project units and/or the common areas are substantially complete and whether there are adequate home owner association budget and reserves. FIG. 6d is a screenshot of a graphical user interface enabling a lender user enter information during the third phase of the acceptance process. In FIG. 6d, the lender user may make representations relating to the project's insurance and marketability, and whether the appraisal of the condo project shows a stable or increasing property value for the condo project. Upon making the representations, the lender user may submit his entries to the system. The lender user may do so in any number of ways, including, but not limited to, depressing a button to submit his entries as shown in FIG. 6d. The server 30 may process the entered information and determine if the lender user has successfully completed phase three of the process.

FIG. 6e is an illustration of a screenshot of a graphical user interface that a lender user may employ to certify that the representations that it has made are true and to make an electronic signature on the system, upon being granted delegated lender review for a condo project.

Figure 6G:
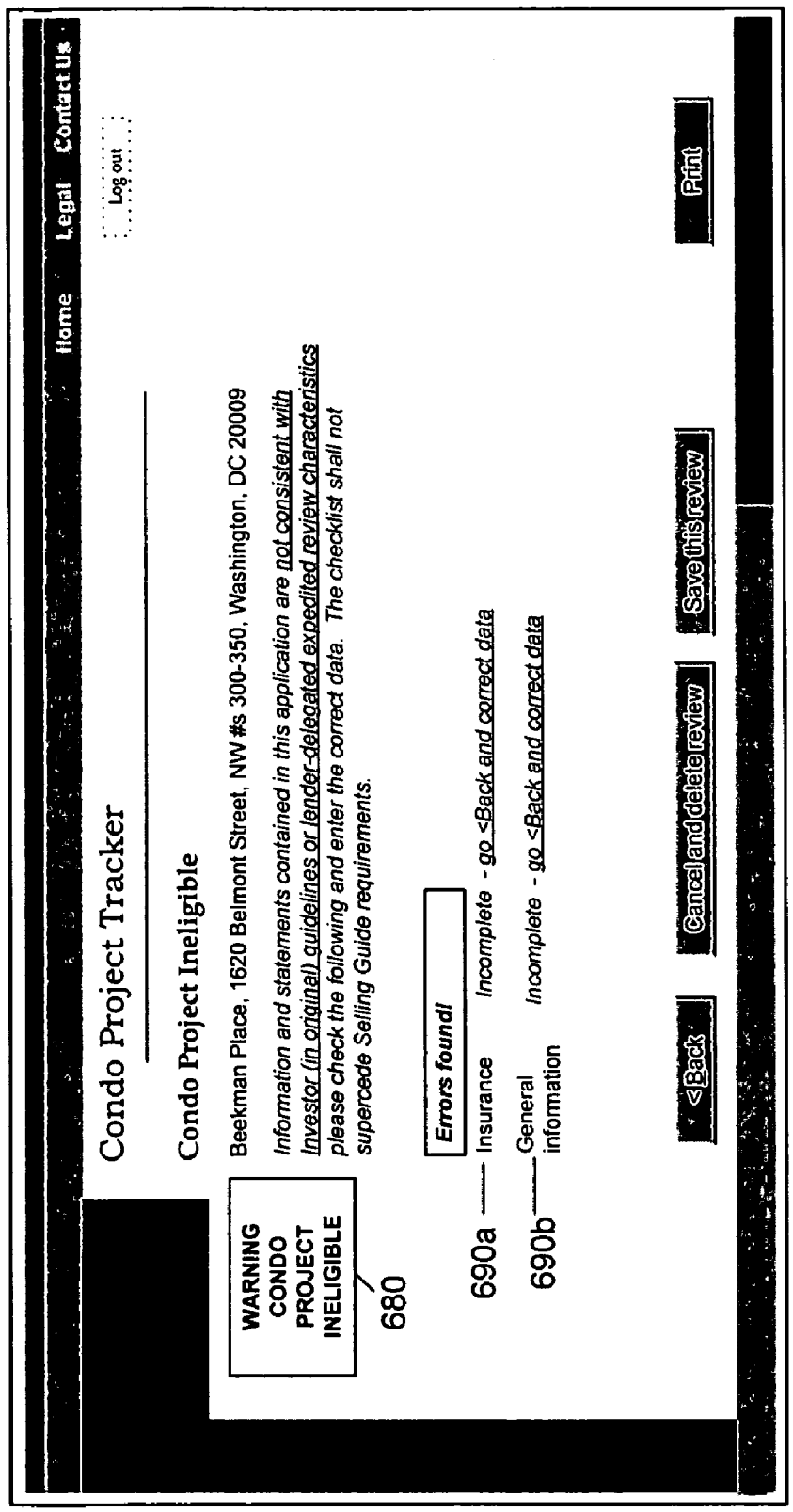
FIG. 6g is a screenshot of a graphical user interface informing a lender that a condo project is ineligible.

The system may then inform the lender user that the acceptance process is complete and give the lender user an expiration date after which the lender user will need to re-certify that information provided is accurate in order to continue to make loans for condo units in the condo project. An exemplary embodiment of a screenshot of a graphical user interface informing the lender user of such is shown in FIG. 6f. FIG. 6f is a screenshot of a graphical user interface informing a lender user of condo project acceptance and a corresponding expiration date for the acceptance. Alternatively, as in FIG. 6g, the system may also inform the lender user of the condo project ineligibility for lender-delegated review 680 due to any number of factors. The basis for ineligibility may also be provided by the system and may include, but is not limited to, missing condo project insurance information 690a or missing condo project general information 690b.

A lender user may also employ the system to generate reports. FIG. 11b is a screenshot of a graphical user interface enabling a lender user to generate reports. The report generator 70, as controlled by the database processing system 65, supports the generation of reports from information stored in database 60. The report generator 70 may permit the user to generate various different reports including, but not limited to, subject matter such as condo projects that have been accepted and a status for one or more condo projects.

The report generator 70 may take any number of steps and permutations of steps in order to generate a report. In one exemplary embodiment, a report generator 70 may generate a report after receiving at a database, a request comprised of criteria describing condo project information in the database, searching the database to find information meeting the criteria, compiling a list of information that meets the criteria in report format, and producing in report format the list of information that meets the criteria.

Figure 8:
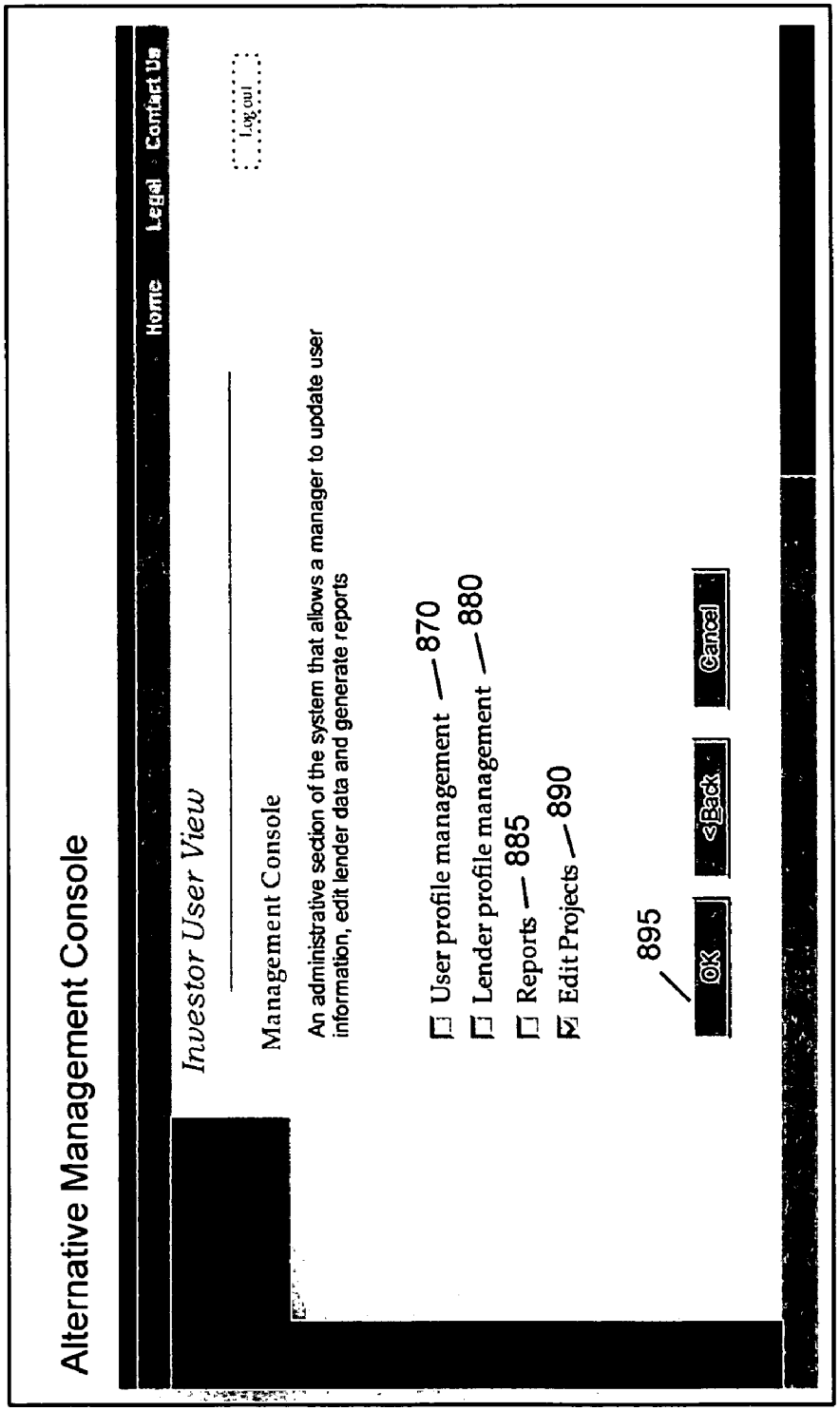
FIG. 8 is a screenshot of a graphical user interface enabling an administrative user to log into the system.

An investor general user or an investor administrative user ("administrative user") may access the system to perform various functions. FIG. 7 is a screenshot of a graphical user interface enabling an investor user to log into the system. FIG. 8 is a screenshot of a graphical user interface enabling an administrative user to access the system. At the startup of the server 30, the graphical user interface may display FIG. 7 or FIG. 8 and at the USER ID 805 dialog box and the PASSWORD 806 dialog box, an investor user or administrative user, respectively, may enter a user name and a password. After entering a user name and a password, the user may depress the LOG IN 807 button to submit the user name and password to the system. If the entries in FIG. 7 indicate an authorized investor user, the server 30 enables the investor user to login and select, one tab from among the REPORTS 810, PROJECTS 820, USERS 830, LENDERS 840, MARKETS 850 OR MESSAGES 860 tabs. If the entries in FIG. 8 indicate an authorized administrative user, the server 30 enables the administrative user to login and select and update user, lender or condo project information or generate reports.

In an exemplary embodiment shown in FIG. 8, an administrative user may update user information (by selecting the USER PROFILE MANAGEMENT dialog box 870 and depressing the OK tab 895), edit lender data (by selecting the LENDER PROFILE MANAGEMENT dialog box 880 and depressing the OK tab 895), generate reports (by selecting the REPORTS dialog box 885 and depressing the OK tab 895), and edit projects (by selecting the EDIT PROJECTS dialog box 890 and depressing the OK tab 895).

For example, reports may be generated via the report generator 70, as controlled by the database processing system 65, which supports the generation of reports from information stored in database 60. The report generator 70 may permit the user to generate various different reports including, but not limited to, subject matter such as all of the condo projects for a lender, the status of one or more condo projects, all condo projects accepted for a particular level of review, all condo projects that have changed in status over a specified period of time, condo projects that appear to be duplicate entries in the database, and all condo projects in progress during a specified period of time.

Enabling investor users to track condo projects also permits the investor to improve guidelines for reviewing condo loans, e.g., to weigh certain characteristics more heavily, or to adjust when to permit lender-delegated reviews versus when to perform full reviews.

In another embodiment, in addition to generating reports, the system includes prioritization logic configured to prioritize condo projects for review by the investor based on the information added to the database by the lenders. For example, for all of the condo projects, and based on the information entered during steps 150-170 for each of the condo projects, the prioritization logic may generate a score for each condo project which assigns a risk for each condo project. The score may reflect, for example, a probability of an adverse event (e.g., delinquency, default) based on information known about the condo project. The score may further be weighted in accordance with the investor's financial exposure to each project in order to determine the level of priority to be assigned to each project. The condo projects may then be displayed to the investor in the investor user interface in a manner that reflects the priority assigned to each condo project.

Figure 9:
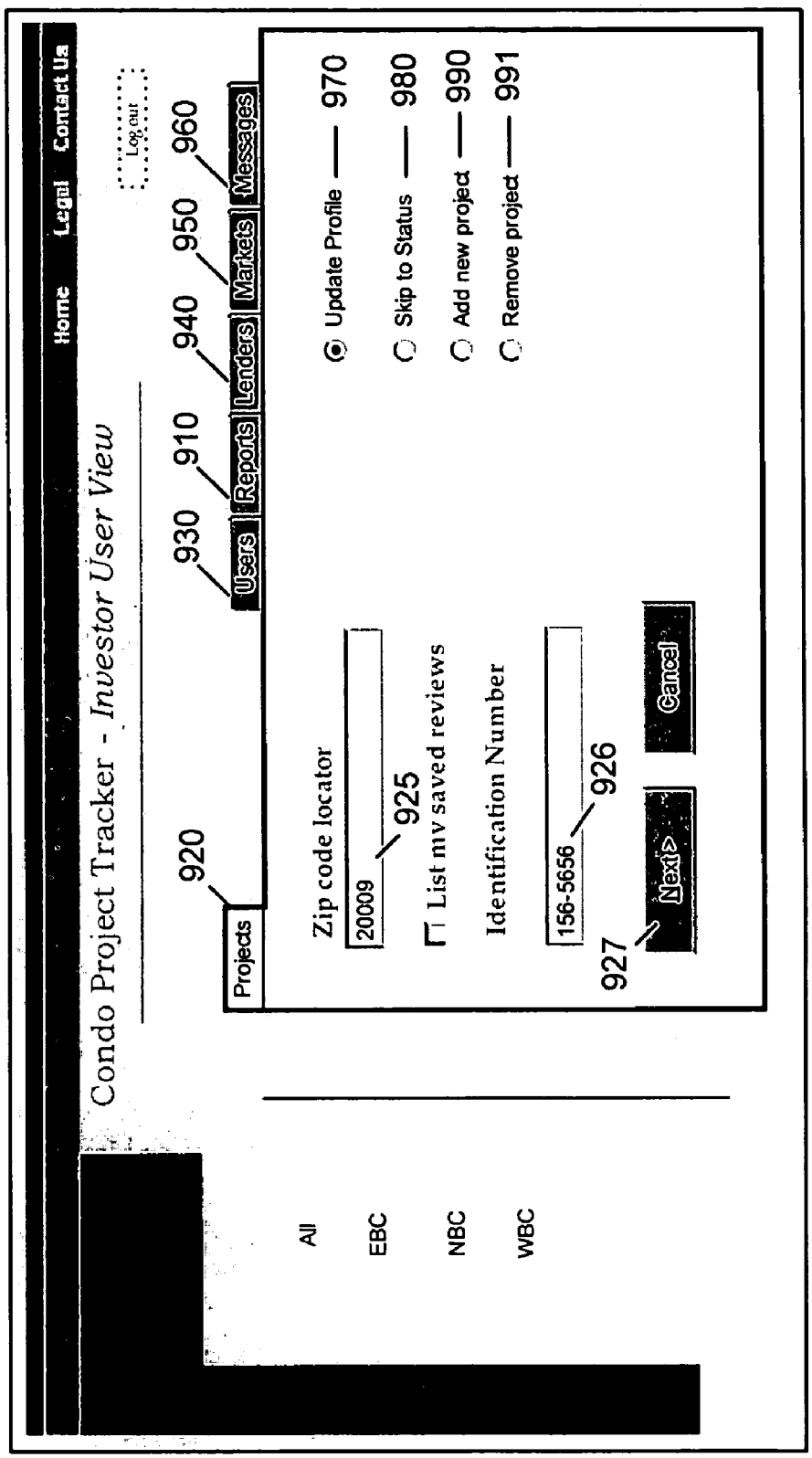
FIG. 9 is a screenshot of a graphical user interface enabling an investor user to search for a condo project.

Referring back to FIG. 7, if the investor user selects the PROJECTS tab 820, the investor user is taken to the graphical user interface illustrated at FIG. 9. At the PROJECTS tab 820, the investor user may locate a project by zip code or identification number by entering a zip code of a condo project into the ZIP CODE LOCATOR dialog box 925 or the IDENTIFICATION NUMBER dialog box 926, respectively. The investor user may also change the status of a condo project. With reference to FIG. 2, upon changing the status of a project, the notification generator 80 may detect the change or the editor 75, which has facilitated the change in status of the condo project, may notify the notification generator 80 of the change in status. Exemplary condo project statuses include, but are not limited to, a status indicating that a condo project is accepted, a status indicating that the project is accepted with exceptions, a status indicating that a condo project must be reviewed in full by an investor, and a status indicating that a condo project has conditionally been accepted. An example of a case in which the status indicating that a condo project is accepted with exceptions may be the case in which the investor needs to review various issues but the condo project is generally accepted.

In either embodiment, upon a change in status being recognized at the notification generator 80, the notification generator 80 may send a message corresponding to the change in status to either the lender user and/or the investor user and/or the administrative user that is involved with the condo project.

Figure 11D:
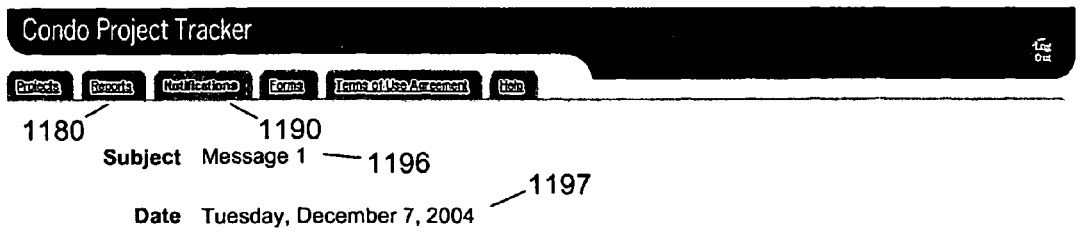
FIG. 11d is a screenshot of the message detail of a notification to a lender user or an investor user.

An investor user may cause a message notification to be generated by the system via the notification generator. FIG. 11d is a screenshot of the message detail of a notification to a lender user or an investor user. Referring back to FIG. 2, the notification generator 80 may take any number of steps and permutations of steps in order to generate a notification. The notification generator may determine the proper notification message to send to users based upon the action taken at the editor 75. In one exemplary embodiment, the notification generator 80 may generate a notification, after detecting a change in status in the editor 75. The notification generator 80 may be disposed to also generate notifications based upon other actions at the editor 75. Further, the notification generator may detect the action at the editor 75 or, alternatively, may forego detection of the actions at the editor 75 and simply generate a notification after receiving a command from the editor 75 and corresponding information concerning the action that was taken at the editor 75.

In order to generate a notification message, a notification generator 80 may send a command to the database 60 to retrieve information that will enable the notification generator 80 to determine to what users the notification should be sent. For example, the notification generator 80 may request that the searcher 90 send a command to the database 60 to retrieve the identities of all lenders that have been involved with a condo project for which the status has been changed. The database 60 may then search its contents by condo project, retrieve a list of lenders that have been involved with the condo project and output the list of lenders to the searcher 90 which may transmit the information to the notification generator 80. The notification generator 80 may then distribute the proper notification message to the list of lenders. The messages that the notification generator 80 distributes may be messages that are pre-stored in the notification generator 80 wherein the content of each remain the same over time, and the set of messages may remain the same or be updated from time to time. Alternatively, the messages may be dynamically generated at the notification generator 80.

In one embodiment, a change in condo project status may cause a notification to be generated at the notification generator 80. A notification may be generated by the system automatically upon a change in status of a condo project.

Figure 10:
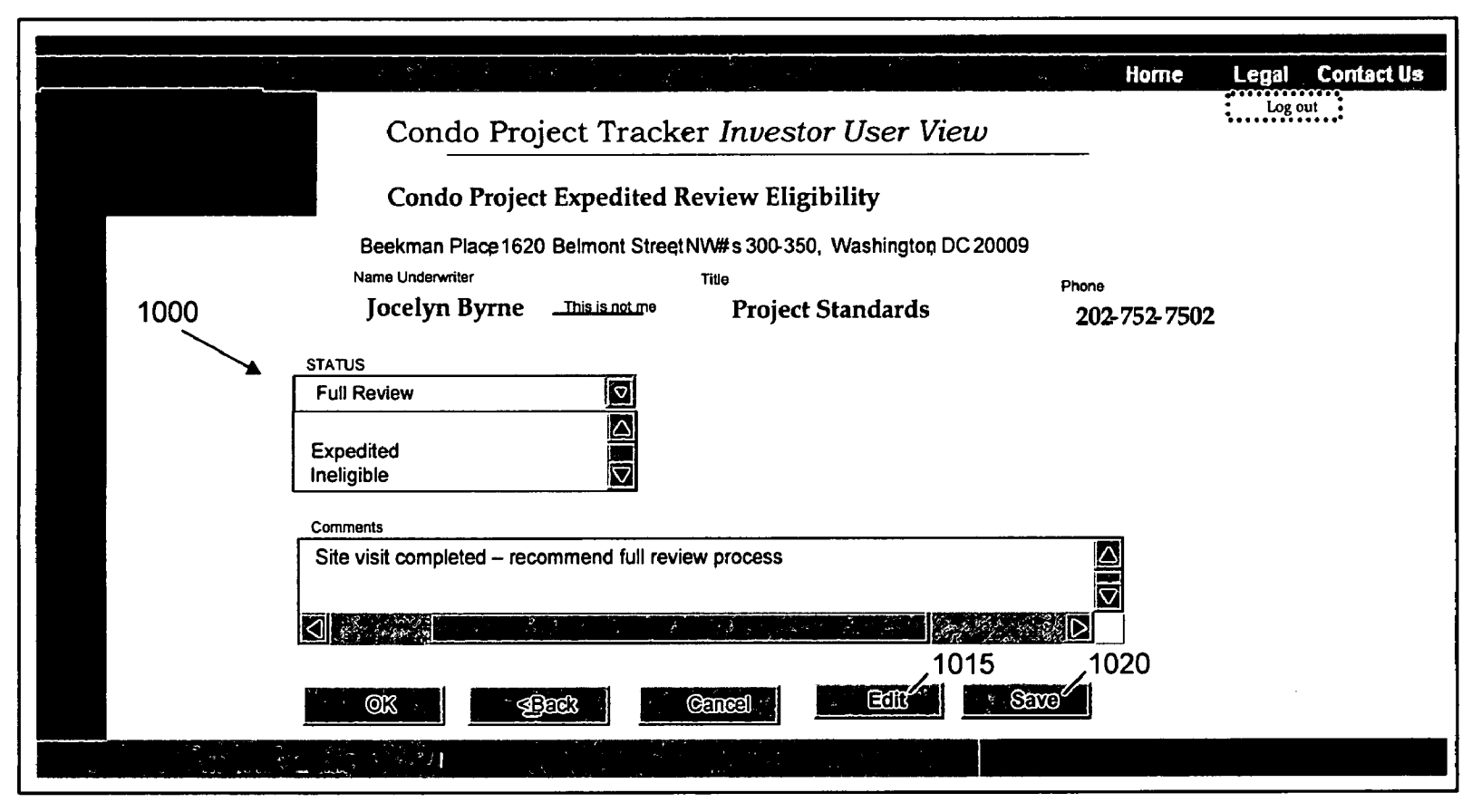

Referring back to FIG. 9, if the investor user selects the SKIP TO STATUS dialog circle 980, the investor user will be taken to a page as shown in FIG. 10. The investor user may view the current status of the condo project at the STATUS dialog box 50 and may select another status at the STATUS dialog box 50 and depress the EDIT button 1015 to change the information or depress the SAVE button 1020 to save the change in the system. By selecting a status from the pull-down menu, the investor user may change the status of the condo project. For example, an investor user may designate a condo project that was previously eligible for lender-delegated review as a condo project that must go through full review, which is performed by the investor.

Referring to FIG. 2, an investor user may employ the database processing system 65 to send a request to view information in the database 60. The viewer 85 may support a user's viewing information in the database 60. The viewer 85 may retrieve information from the database 60, format the retrieved information in a viewable format and send the information to a display panel at the server 30, to a lender computer 10 or to an investor computer 20.

The system may be designed such that the information that may be retrieved by the viewer 85 by a user differs depending upon the access rights of the user. The access rights of the user may be known by the system by the login and password information that the user enters to log on to the system.

Referring back to FIG. 9, the investor user may also add a new condo project, remove a condo project or update general user or an administrative user profile. The investor general user or investor administrative user may perform these functions by selecting the dialog circle corresponding to the task that the investor user desires to perform and depressing the NEXT>button 927. Alternatively, the investor user may depress the following tabs: USERS 930, REPORTS 910, LENDERS 940, MARKETS 950 OR MESSAGES 960, and the server 30 will take the investor user to the page corresponding to the tab.

Figure 12:
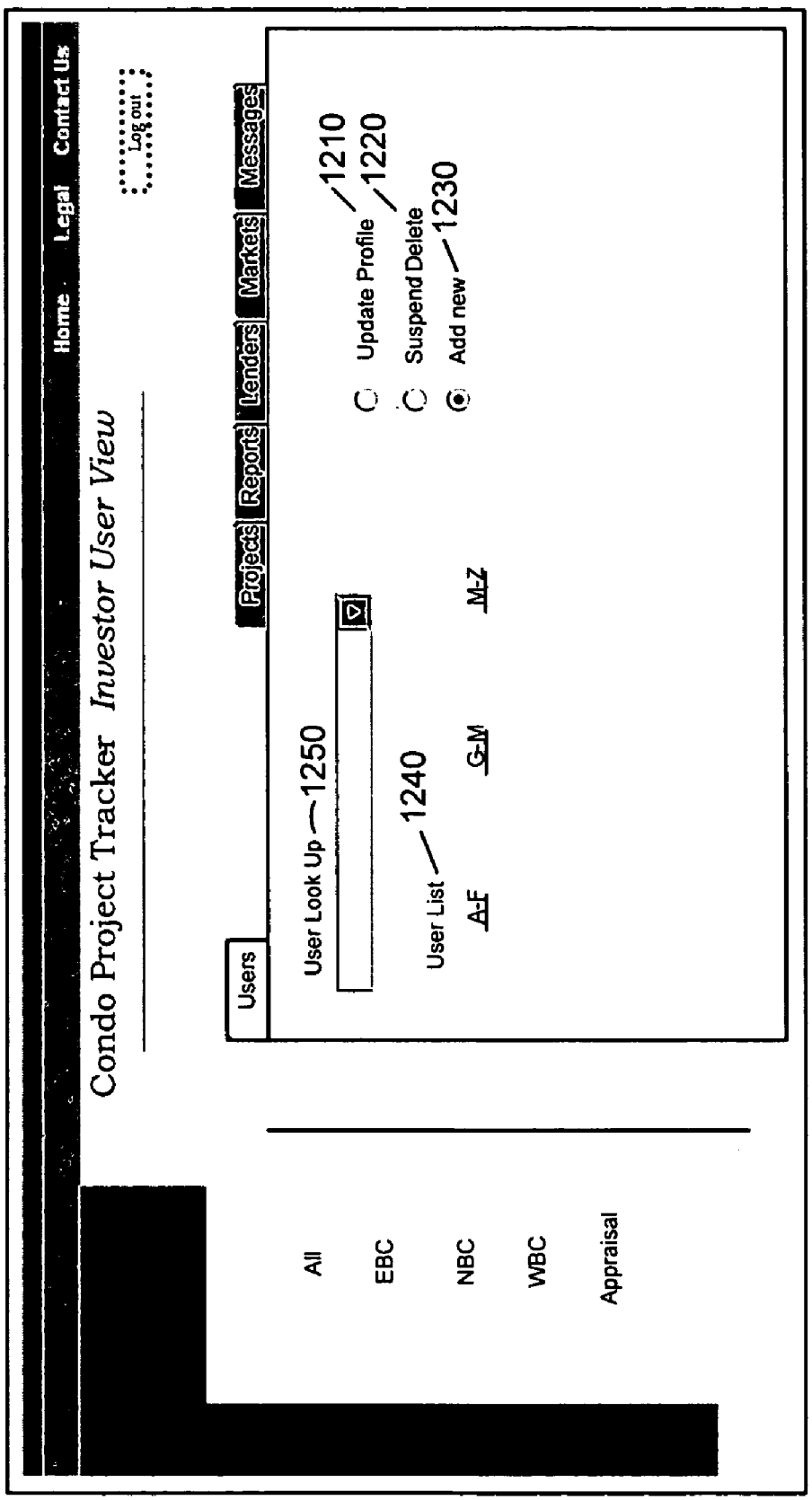
FIG. 12 is a screenshot of a graphical user interface enabling an investor user to edit system users.

The investor user may edit users by selecting USERS tab 930 from the login screen and the investor user will be taken to a graphical user interface as illustrated in FIG. 12. Editing the set of user profile refers to the process whereby the investor user may add a new user as capable of having access to the system by selecting the ADD NEW tab 1230, suspend access or delete a user profile by selecting the SUSPEND/DELETE tab 1220, update an existing user profile by selecting UPDATE PROFILE tab 1210. Alternatively, the investor user may search for an existing user by clicking the USER LIST link 1240 or may use the pull-down menu to search for an existing user at the pull down menu located at 1250. FIG. 12 is a screenshot of a graphical user interface enabling an investor user to edit system users.

Figure 10A:
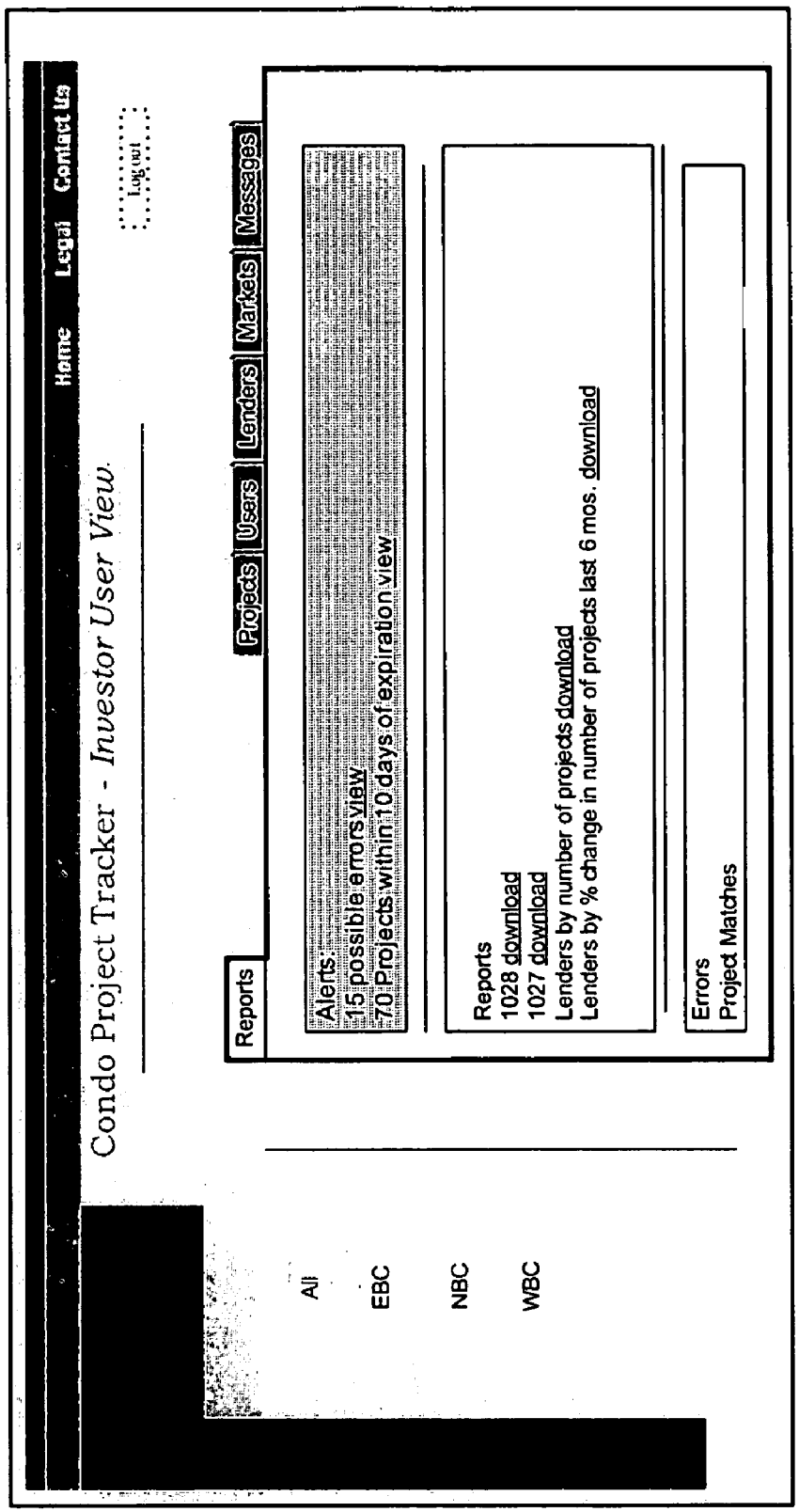
FIG. 10a is a screenshot of a graphical user interface enabling an investor user to generate reports related to topics such as condo projects subject to certain levels of review and lenders involved with certain condo projects.
Figure 10B:
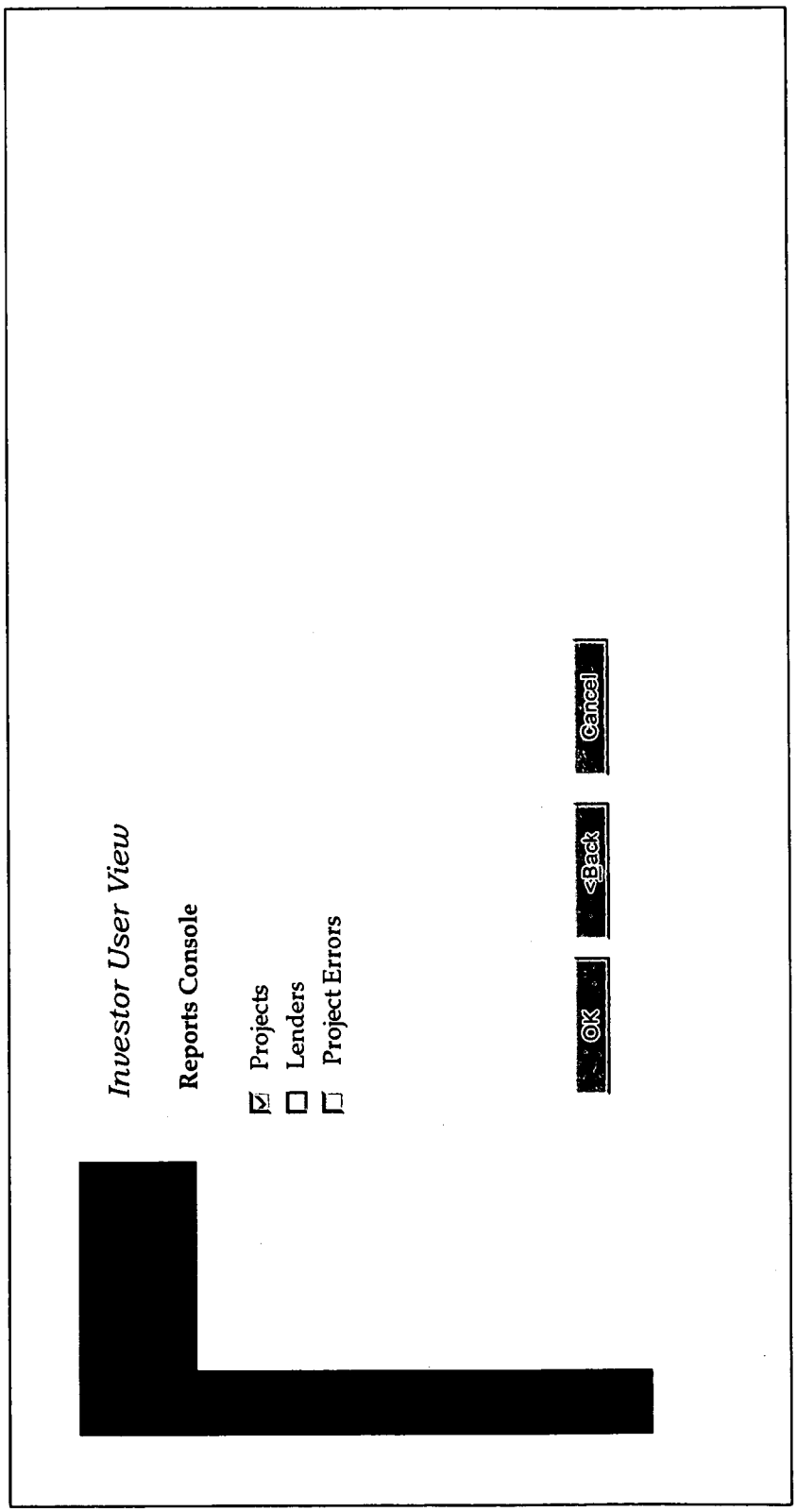
FIG. 10b is a screenshot of a graphical user interface enabling an investor user to generate reports related to projects, lenders or condo project errors.
Figure 10D:
FIG. 10d is an exemplary report indicating all condo projects for which there has been a change in status over a specified time period.

Referring back to FIG. 7, the REPORTS tab 810 takes the investor user to a graphical user interface as illustrated at FIGS. 10*a* and 10*b* that enable the user to generate reports. The system may enable an investor user to generate various reports, including, but not limited to, a report indicating the level of review for a condo project or a report indicating the condo projects that have had a change in status over a specified time period. FIG. 10*c* is an exemplary report indicating all condo projects that are in the lender-delegated review process during a specified time period. In column 1110, the report indicates the condo project name and in column 1120, the report indicates the status of the condo project. An exemplary embodiment of a report indicating all condo projects for which there has been a change in status over a specified time period is shown at FIG. 10*d*. Column 1130 indicates the old status, column 1140 indicates the new status and column 1150 indicates whether the change in the status was negative.

The project management system may also be designed to detect project errors such as duplicate condo project entries, and report these errors to the investor user. FIG. 10*e* is an illustration of an exemplary report that may be produced indicating the condo projects that are likely to be duplicate entries. Section 1160 indicates the original condo project entry and section 1170 indicates the suspected duplicate condo project entries. The system may be disposed to automatically report this information to an investor user or an administrative user upon detection and may therefore be another source of feedback in the system.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

As noted above, embodiments within the scope of the present invention include computer program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

What is claimed is:

1. A data processing system configured to provide a first review output indicating results of a review of a real estate project and a second review output indicating results of a review of a mortgage loan application, the real estate project being one of a plurality of real estate projects, each of the plurality of real estate projects comprising a plurality of individual units, the mortgage loan application being an application for a mortgage loan secured by one of the individual units of the real estate project, comprising:

a database, the database being configured to store information regarding the plurality of real estate projects, the plurality of real estate projects including projects which are under development and projects which are completed;

lender user interface logic implemented in instructions stored in computer-readable storage media and a machine that executes the instructions, the lender user interface logic being configured to provide a lender user interface accessible to lenders, the lender user interface logic providing the lenders with access to the database to permit the lenders to add at least one of additional and updated information in the database concerning the plurality of real estate projects, wherein, for each of the plurality of real estate projects, the lender user interface logic generates screen displays configured to receive information concerning the real estate project as a whole and information concerning any of the plurality of individual units within the real estate project;

investor user interface logic implemented in the instructions stored in the computer-readable storage media and the machine that executes the instructions, the investor user interface logic being configured to provide an investor user interface accessible to an investor, the investor having relationships with the lenders in which the investor provides funding for mortgage loans secured by the plurality of properties that are part of the plurality of real estate projects in exchange for an interest in the mortgage loans, and the investor interface logic being configured to permit the investor to track the at least one of the additional and updated information added in the database by the lenders or accept the real estate project;

report generation logic implemented in the instructions stored in the computer-readable storage media and the machine that executes the instructions, the report generation logic being configured to provide the first review output indicating the results of the review of the real estate project, the first review output including an indication whether the real estate project has been accepted by the investor; and an automated underwriting engine configured to generate an underwriting recommendation, the underwriting recommendation being the second review output indicating the results of the review of the mortgage loan application based on loan information contained in the mortgage loan application for the mortgage loan, the loan information including information concerning the individual unit, the underwriting recommendation being generated based on the mortgage loan being secured by the individual unit.

2. A system as defined in claim 1, wherein the investor user interface logic is configured to permit the investor to perform quality control of the at least one of the additional and updated information added by the lenders into the database.

3. A system as defined in claim 1, wherein the database implements a shared information repository storing shared information, the shared information being shared by multiple ones of the lenders with each of the multiple lenders having the ability to add to and edit the shared information.

4. A system as defined in claim 3, wherein at least some of the at least one of the additional and updated information added to the database by the lenders can not be shared between the lenders.

5. A system as defined in claim 4, wherein the at least one of the additional and updated information that can not be shared between the lenders includes information that the lenders represent/warrant to be correct.

6. A system as defined in claim 1, wherein the lender user interface logic is configured to receive representations/warranties from the lenders that the at least one of the additional and updated information added to the database is accurate, the representations/warranties causing risk of default to shift to the lender for a particular mortgage loan if the at least one of the additional and updated information added to the database for a corresponding one of the plurality of real estate projects is not accurate.

7. A system as defined in claim 1, further comprising prioritization logic, the prioritization logic being configured to prioritize the plurality of real estate projects for review by the investor based on the at least one of the additional and updated information added to the database by the lenders.

8. A system as defined in claim 1, wherein the lender user interface logic and the investor user interface logic each include logic which respectively permits lenders and investors to generate reports based on the information in the database concerning the plurality of real estate projects.

9. A system as defined in claim 1, further comprising logic configured to permit lenders to obtain acceptance for a selected one of the plurality of real estate projects for which information is present in the database.

10. A system as defined in claim 1, wherein the information regarding the plurality of real estate projects stored in the database comprises at least one of geographical information, lender information, and project status information.

11. A system defined in claim 1, wherein the information regarding the plurality of real estate projects stored in the database comprises project status information regarding a project status of a selected one of the real estate projects, and wherein the project status is one of:
 a status indicating that the real estate project is accepted:
 a status indicating that the real estate project is accepted with exceptions;
 a status indicating that the real estate project must be reviewed in full by an investor; and
 a status indicating that the real estate project has conditionally been accepted.

12. A system as defined in claim 1, further comprising reporting logic configured to generate a report showing the percentage of loans for a real estate project that have defaulted.

13. A system as defined in claim 1, wherein the report generation logic is further configured to generate a report of real estate projects that have been accepted.

14. A system as defined in claim 1, wherein the lender user interface is a web-based user interface that is provided by the lender user interface logic via the Internet.

15. A system as defined in claim 1, wherein the real estate projects are condominium projects.

16. A system as defined in claim 1, wherein the at least one of the additional and updated information added by the lenders comprises information concerning the type of real estate project to be reviewed, including information concerning whether the real estate project is a timeshare and information concerning whether the real estate project is a non-conforming use of the land.

17. A system as defined in claim 1, wherein the at least one of additional and updated information added by the lenders comprises information concerning risk characteristics of the real estate project, including information concerning whether the real estate project is a leasehold and information concerning whether the real estate project is manufactured housing.

18. A computer-implemented data processing system configured to provide a first review output indicating results of a review of a condominium project and a second review output indicating results of a review of a mortgage loan application, the condominium project being one of a plurality of condominium projects, each of the plurality of condominium projects comprising a plurality of individual units, the mortgage loan application being an application for a mortgage loan secured by one of the individual units of the condominium project, the computer-implemented data processing system comprising:

(A) a database, the database being configured to store information regarding the plurality of condominium projects including condominium projects which are under development and condominium projects which are completed, the database implementing a shared information repository which stores shared information;

(B) lender user interface logic implemented in instructions stored in the computer-readable storage media and the machine that executes the instructions, the lender user interface logic being configured to provide a web-based lender user interface accessible to lenders by way of the Internet, the lender user interface logic providing the lenders with access to the database to permit the lenders to add at least one of additional and updated information in the database concerning the plurality of condominium projects, the lender user interface logic providing the lenders with shared access to the shared information in the database, the lender user interface logic being configured to receive representations/warranties from the lenders that the at least one of the additional and updated information added to the database is accurate, the representations/warranties causing risk of default to shift to the lender for a particular mortgage loan if the at least one of the additional and updated information added to the database for the particular mortgage loan is not accurate, and wherein, for each of the plurality of condominium projects, the lender user interface logic generates screen displays configured to receive information concerning the condominium project as a whole and information concerning any of the plurality of individual units within the condominium project;

(C) investor user interface logic implemented in the instructions stored in the computer-readable storage media and the machine that executes the instructions, the investor user interface logic being configured to provide an investor user interface accessible to an investor, the investor having relationships with the lenders in which the investor provides funding for mortgage loans secured by properties that are part of the plurality of condominium projects in exchange for an interest in the mortgage loans, and the investor interface logic being configured to permit the investor to track the at least one of additional and updated information added in the database by the lenders or to accept the condominium project;

(D) project review logic implemented in the instructions stored in the computer-readable storage media and the machine that executes the instructions, the project review logic being configured to process the data provided by the lenders and to assign one of a plurality of available review types to each of the plurality of condominium projects, the review types being distinguishable from each other in terms of the level of review to be provided to each condominium project and whether review tasks are to be performed by the lender or by the investor entity;

(E) report generation logic implemented in the instructions stored in the computer-readable storage media and the machine that executes the instructions, the report generation logic being configured to provide the first review output indicating the results of the review of the condominium project, the first review output including an indication whether the condominium project has been accepted by the investor, generating reports which provide an aggregated view of condominium projects aggregated across the lenders and providing tools to evaluate risks across the condominium projects;

(F) prioritization logic implemented in the instructions stored in the computer-readable storage media and the machine that executes the instructions, the prioritization logic being configured to prioritize the plurality of condominium projects for review by the investor based on the at least one of additional and updated information added to the database by the lenders; and wherein at least some of the at least one of additional and updated information added to the database by the lenders can not be shared between the lenders, wherein the at least one of additional and updated information that can not be shared between the lenders includes information that the lenders represent/warrant to be correct; and (G) an automated underwriting engine configured to generate an underwriting recommendation, the underwriting recommendation being the second review output indicating the results of the review of the mortgage loan application based on loan information contained in the mortgage loan application for the mortgage loan, the loan information including information concerning the individual unit, the underwriting recommendation being generated based on the mortgage loan being secured by the individual unit.

19. A system as defined in claim 18, wherein the at least one of additional and updated information added by the lenders comprises information concerning the type of condominium project to be reviewed, including information concerning whether the condominium project is a timeshare and information concerning whether the condominium project is a non-conforming use of the land.

20. A system as defined in claim 18, wherein the at least one of additional and updated information added by the lenders comprises information concerning risk characteristics of the condominium project, including information concerning whether the project is a leasehold and information concerning whether the condominium project is manufactured housing.

* * * * *

UNITED STATES PATENT AND TRADEMARK OFFICE
CERTIFICATE OF CORRECTION

PATENT NO. : 7,801,809 B1 Page 1 of 1
APPLICATION NO. : 11/167068
DATED : September 21, 2010
INVENTOR(S) : Jeanne M. Hunter et al.

It is certified that error appears in the above-identified patent and that said Letters Patent is hereby corrected as shown below:

Title page, item [75] should read: Sharmila Srivastav, Vienna, VA

Signed and Sealed this

Seventh Day of December, 2010

David J. Kappos
*Director of the United States Patent and Trademark Office*